US009603104B2

(12) United States Patent
Shan et al.

(10) Patent No.: US 9,603,104 B2
(45) Date of Patent: Mar. 21, 2017

(54) TECHNIQUES FOR USER PLANE CONGESTION MITIGATION

(71) Applicant: INTEL IP CORPORATION, Santa Clara, CA (US)

(72) Inventors: Chang H Shan, Shanghai (CN); Muthaiah Venkatachlam, Beaverton, OR (US); Eric Siow, Beaverton, OR (US); Puneet K. Jain, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 352 days.

(21) Appl. No.: 14/129,952

(22) PCT Filed: Nov. 5, 2013

(86) PCT No.: PCT/US2013/068491
§ 371 (c)(1),
(2) Date: Dec. 28, 2013

(87) PCT Pub. No.: WO2014/109818
PCT Pub. Date: Jul. 17, 2014

(65) Prior Publication Data
US 2015/0201352 A1 Jul. 16, 2015

Related U.S. Application Data

(60) Provisional application No. 61/752,386, filed on Jan. 14, 2013.

(51) Int. Cl.
*H04W 48/18* (2009.01)
*H04W 52/24* (2009.01)
(Continued)

(52) U.S. Cl.
CPC ......... *H04W 52/243* (2013.01); *H04L 1/1861* (2013.01); *H04L 5/0055* (2013.01);
(Continued)

(58) Field of Classification Search
CPC ..................................................... H04W 28/08
(Continued)

(56) References Cited

U.S. PATENT DOCUMENTS

2009/0061877 A1\* 3/2009 Gallagher ........... H04W 76/022
455/436
2010/0284278 A1 11/2010 Alanara
(Continued)

OTHER PUBLICATIONS

International Search Report and Written Opinion received for PCT Patent Application No. PCT/US2013/068491, mailed Feb. 17, 2014, 13 pages.
(Continued)

*Primary Examiner* — Wei Zhao

(57) ABSTRACT

Various embodiments are generally directed to improved techniques for UPCON mitigation. In one embodiment, for example, an evolved node B (eNB) may comprise a processor circuit, a detection component for execution by the processor circuit to detect user plane congestion between an evolved universal mobile telecommunications system (UMTS) terrestrial radio access network (E-UTRAN) and a serving gateway (S-GW) of an evolved packet core (EPC), and a configuration component for execution by the processor circuit to select a set of user equipment (UEs) served by the E-UTRAN and the S-GW and send a request to utilize an alternate S-GW of the EPC to serve the set of UEs while maintaining a current packet data network (PDN) gateway (P-GW) for the set of UEs. Other embodiments are described and claimed.

25 Claims, 20 Drawing Sheets

(51) Int. Cl.

| | |
|---|---|
| H04W 52/28 | (2009.01) |
| H04W 72/04 | (2009.01) |
| H04L 5/14 | (2006.01) |
| H04W 24/02 | (2009.01) |
| H04W 24/10 | (2009.01) |
| H04W 28/02 | (2009.01) |
| H04L 12/813 | (2013.01) |
| H04L 12/801 | (2013.01) |
| H04W 28/08 | (2009.01) |
| H04L 1/18 | (2006.01) |
| H04L 5/00 | (2006.01) |

(52) U.S. Cl.
CPC ............... *H04L 5/14* (2013.01); *H04L 47/12* (2013.01); *H04L 47/20* (2013.01); *H04W 24/02* (2013.01); *H04W 24/10* (2013.01); *H04W 28/0247* (2013.01); *H04W 28/0252* (2013.01); *H04W 28/08* (2013.01); *H04W 52/244* (2013.01); *H04W 52/283* (2013.01); *H04W 72/0413* (2013.01)

(58) Field of Classification Search
USPC ......................................................... 370/235
See application file for complete search history.

(56) References Cited

U.S. PATENT DOCUMENTS

| | | | |
|---|---|---|---|
| 2011/0283011 A1 | 11/2011 | Li et al. | |
| 2013/0010598 A1* | 1/2013 | Ludwig | H04L 47/10 370/235 |
| 2013/0010754 A1 | 1/2013 | Xu et al. | |
| 2013/0208661 A1 | 8/2013 | Nylander et al. | |
| 2015/0282058 A1* | 10/2015 | Forssell | H04W 48/18 455/552.1 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Sep. 26, 2012, (author unknown) 205 pages.

Extended European Search Report received for European Patent Application No. 13871075.1, mailed Aug. 1, 2016, 9 pages.

"3rd Generation Partnership Project; Technical Specification Group Services and System Aspects; System Enhancements for User Plane Congestion Management (Release 12)", 3GPP TR UPCON, XP050690989, vo.1.0 (Nov. 2012), 9 pages, (author unknown).

"S1-U TNL congestion indication", 3GPP TSG-RAN WG3 Meeting #61, R3-082224, Aug. 2008, 3 pages, (author unknown).

"UPCON key issues", SA WG2 Meeting #94, S2-124462, XP050684110, Nov. 2012, 2 pages, (author unknown).

"S1-U Congestion Mitigation Solution", SA WG2 Meeting #95, S2-130198, XP050684626, Jan. 2013, 13 pages, (author unknown).

"S1-U Congestion Mitigation Solution", SA WG2 Meeting #96, S2-131103, XP050708318, Apr. 2013, 14 pages, (author unknown).

* cited by examiner

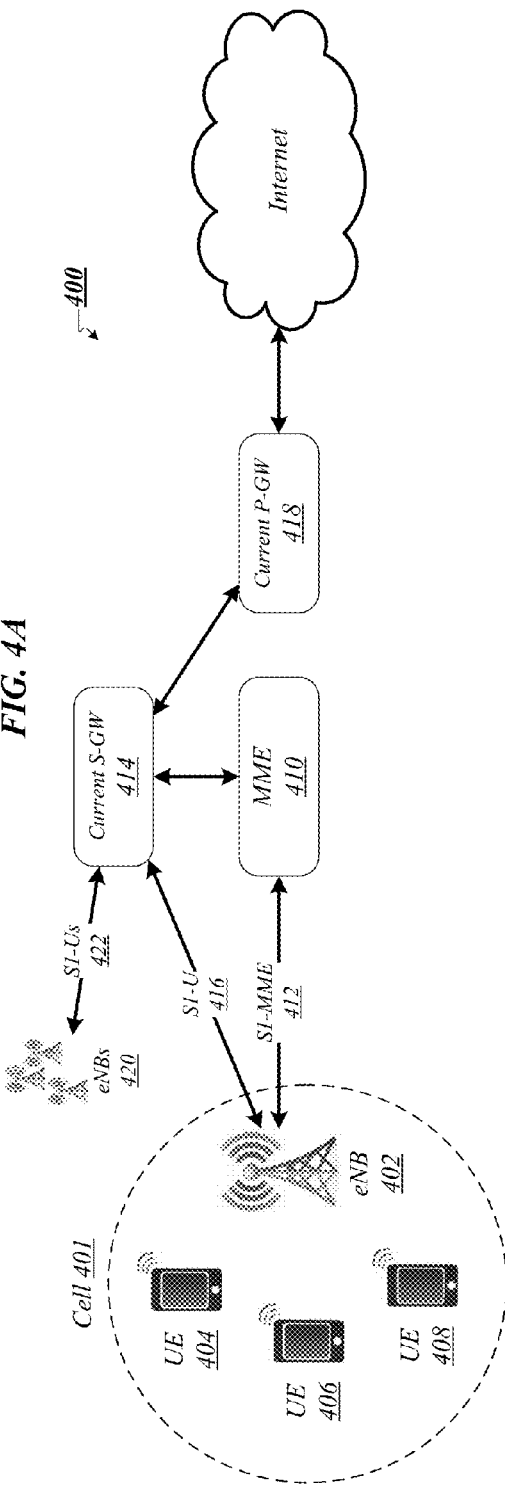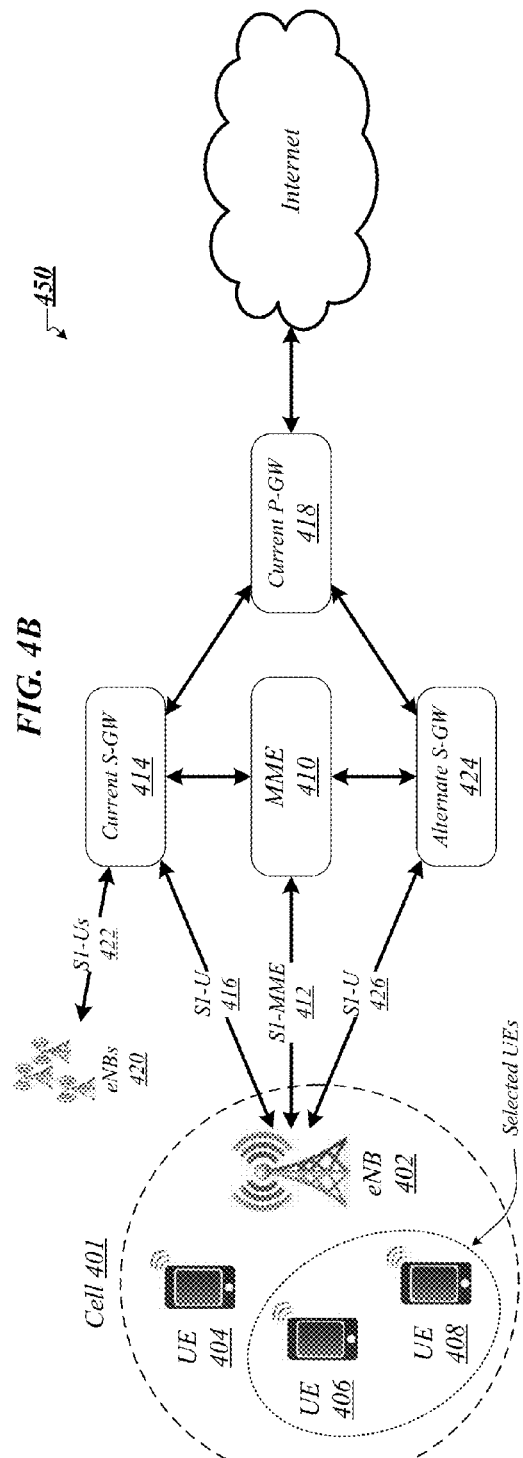

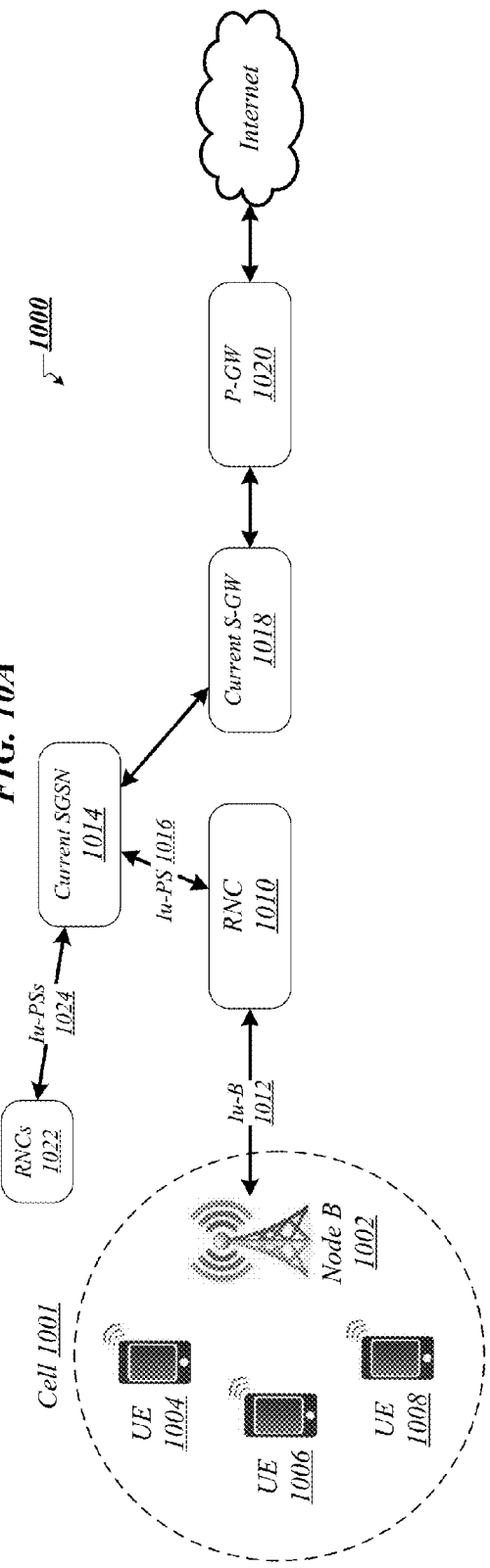
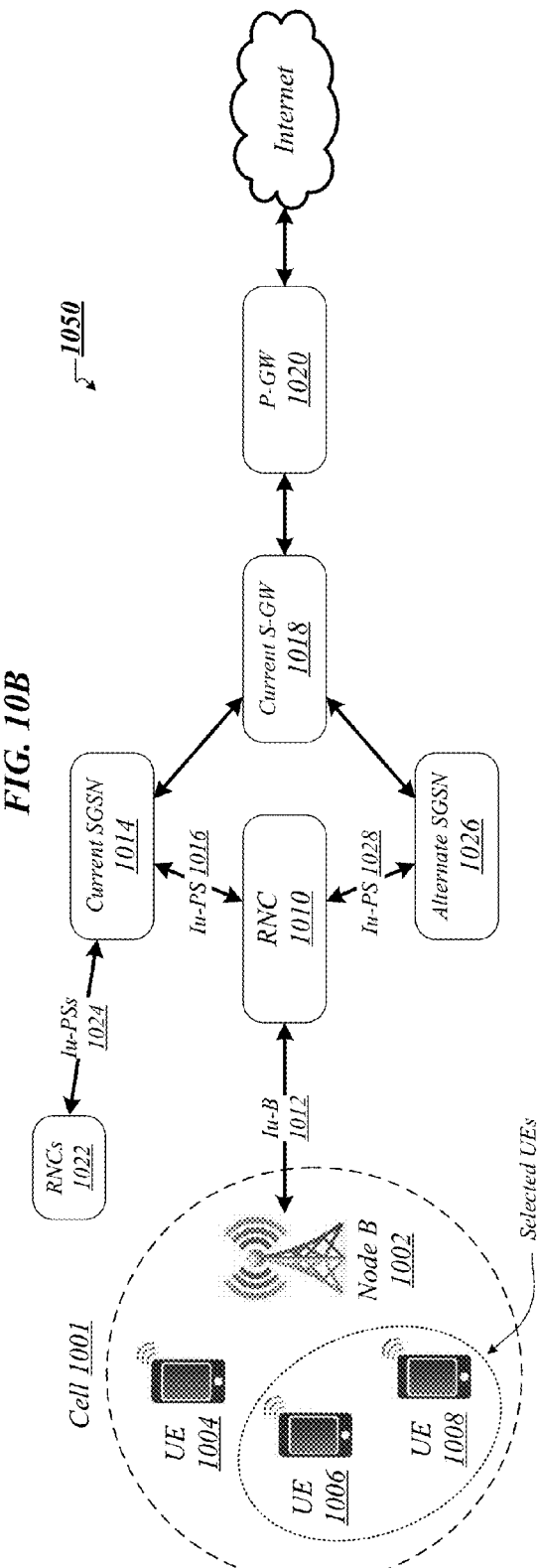
FIG. 10A
FIG. 10B

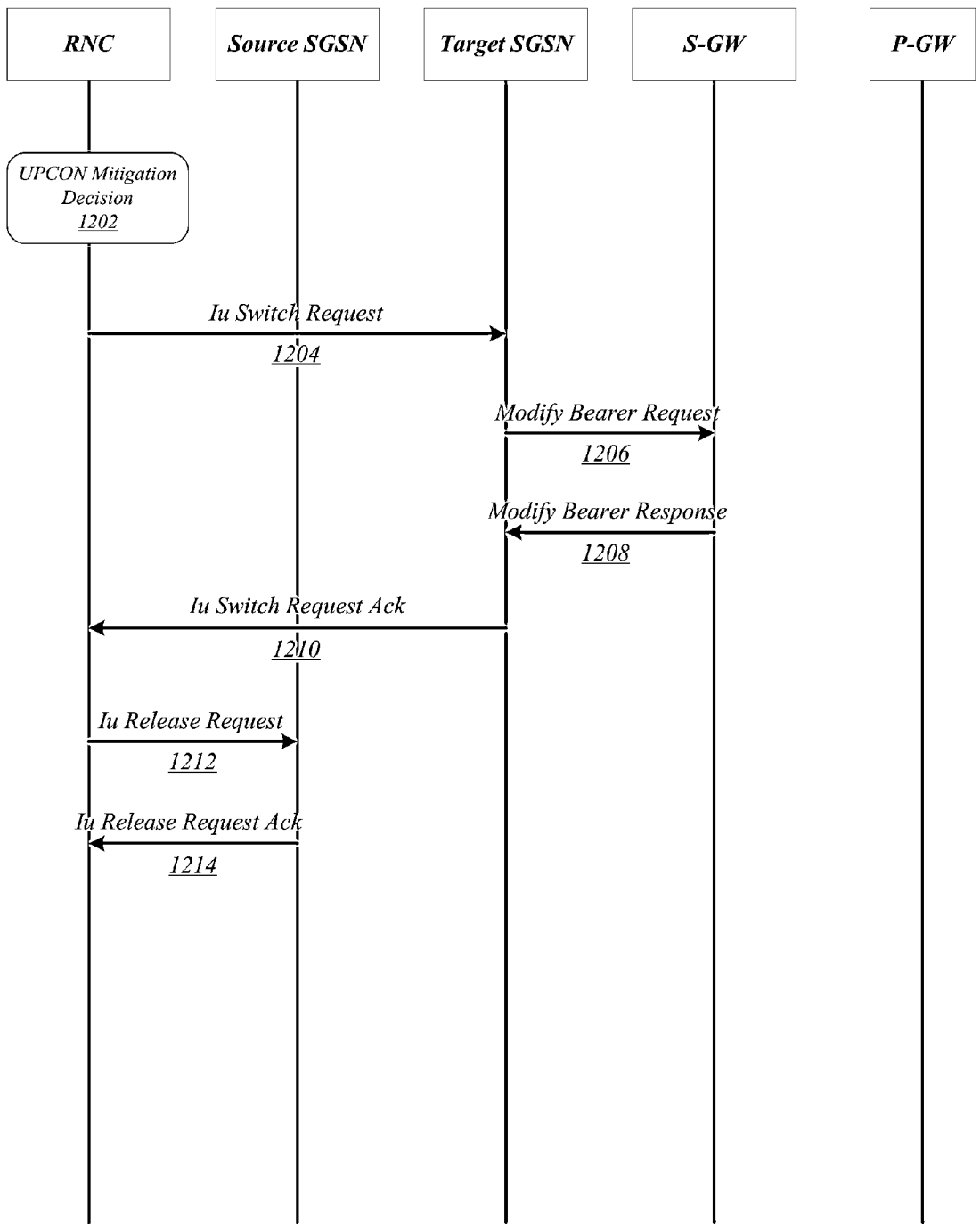

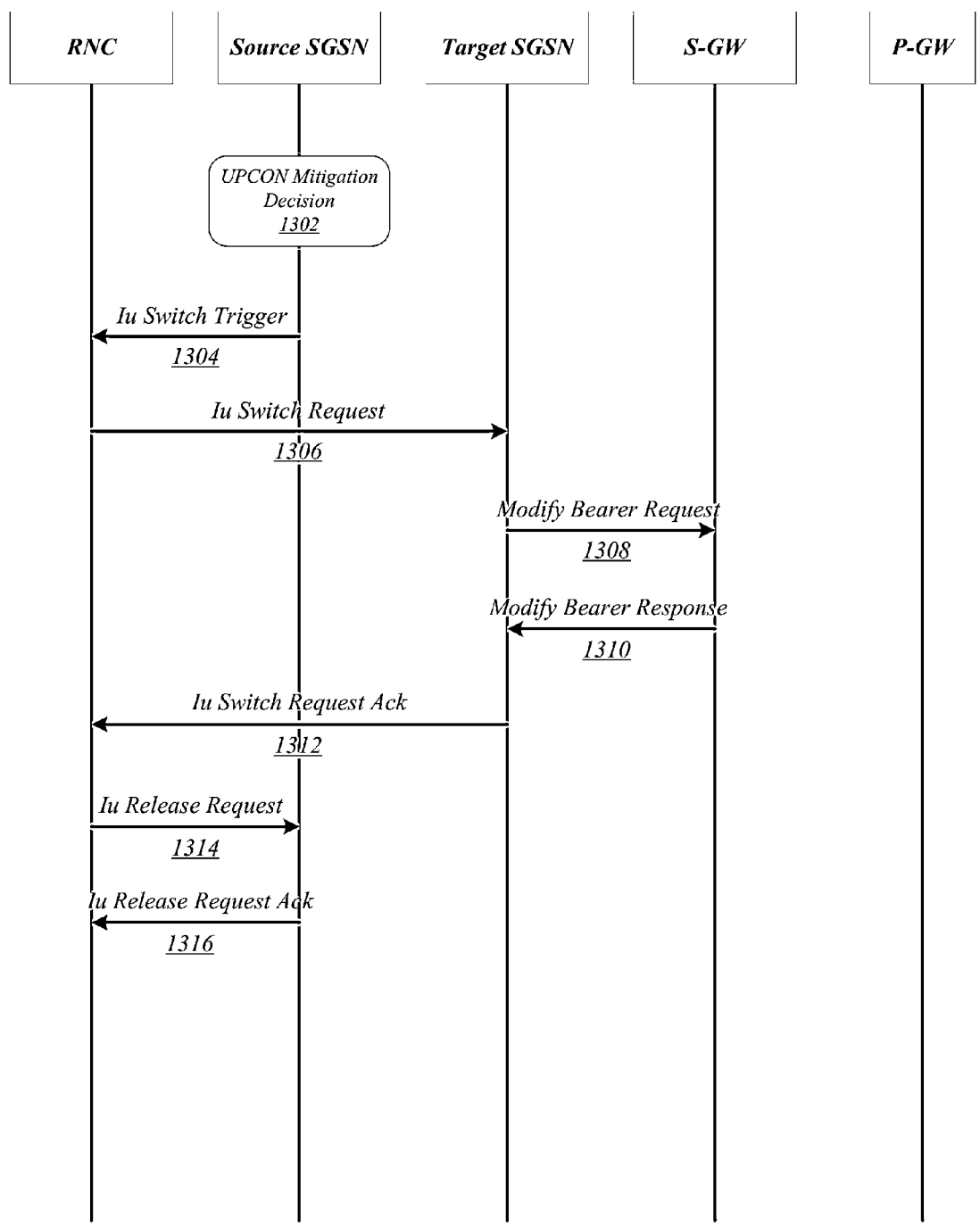

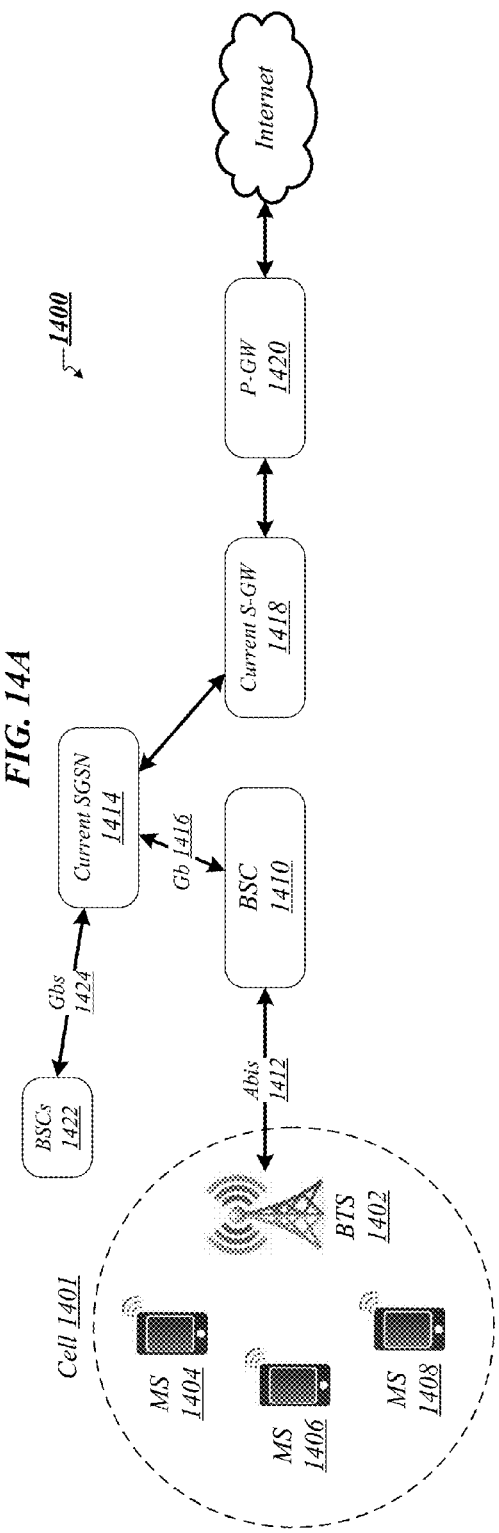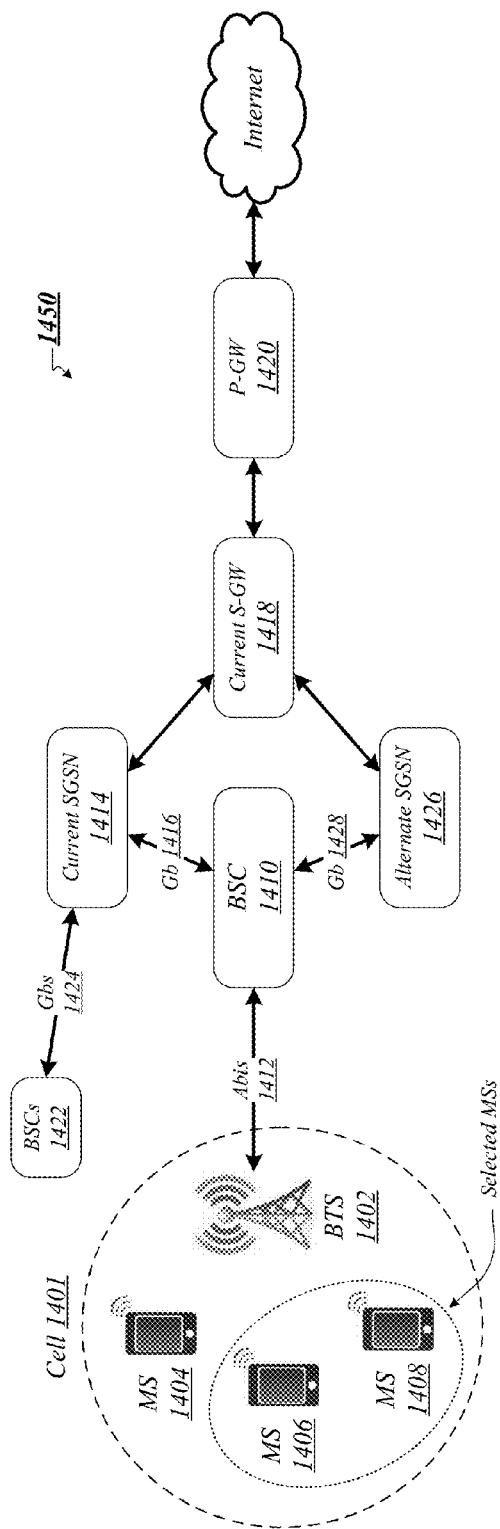

*FIG. 18*

_Storage Medium 1800_

*Computer Executable Instructions for 300*

*Computer Executable Instructions for 500*

*Computer Executable Instructions for 900*

*Computer Executable Instructions for 1100*

*Computer Executable Instructions for 1500*

TECHNIQUES FOR USER PLANE CONGESTION MITIGATION

RELATED CASE

This application claims priority to U.S. Provisional Patent Application No. 61/752,386, filed Jan. 14, 2013, the entirety of which is hereby incorporated by reference.

TECHNICAL FIELD

Embodiments herein generally relate to wireless mobile broadband communications.

BACKGROUND

In various wireless communications systems, mobile devices in various cells of a radio access network may obtain data service from a packet core via a radio-to-packet interface between the radio access network and the packet core. User plane congestion (UPCON) may occur if the total amount of data traffic of the mobile devices in the various cells approaches, reaches, and/or exceeds a capacity of the radio-to-packet interface. One approach for UPCON mitigation may involve reallocating data traffic of one or more mobile devices to an alternate radio-to-packet interface. However, conventional techniques for performing such reallocation may involve unnecessarily modifying more than one waypoint in the data path, rather than modifying a single waypoint. For example, a conventional UPCON mitigation technique may involve selecting both an alternate serving gateway and an alternate packet gateway for handling reallocated data traffic, rather than simply selecting an alternate serving gateway while maintaining a current packet gateway for the reallocated data traffic.

BRIEF DESCRIPTION OF THE DRAWINGS

FIG. 4A illustrates one embodiment of a first network.

FIG. 4B illustrates a second embodiment of the first network.

FIG. 10A illustrates one embodiment of a second network.

FIG. 10B illustrates a second embodiment of the second network.

FIG. 12 illustrates one embodiment of a fourth communications flow.

FIG. 13 illustrates one embodiment of a fifth communications flow.

FIG. 14A illustrates one embodiment of a third network.

FIG. 14B illustrates a second embodiment of the third network.

FIG. 18 illustrates one embodiment of a storage medium

DETAILED DESCRIPTION

Figure 1:
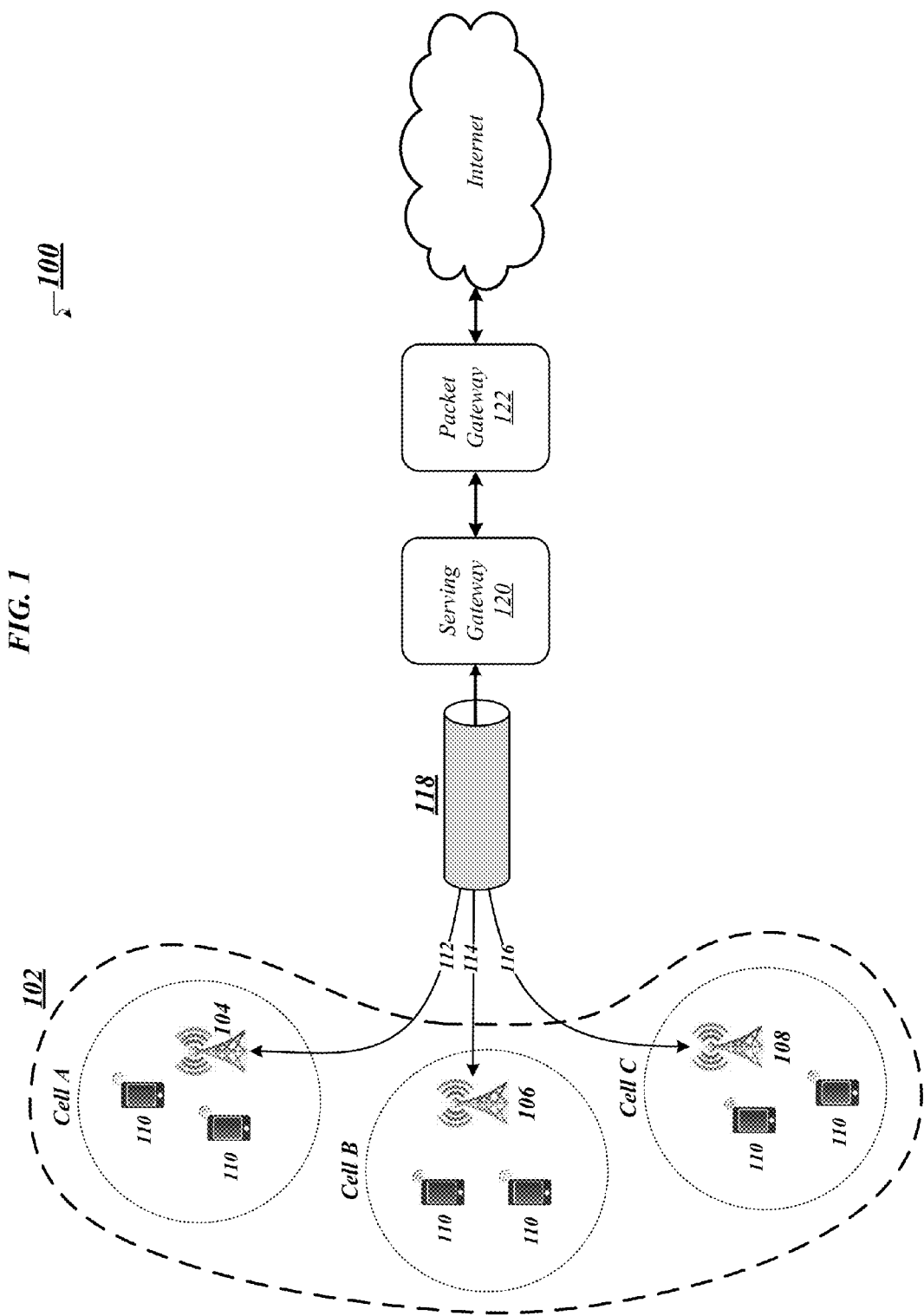
FIG. 1 illustrates one embodiment of an operating environment.

Various embodiments are generally directed to improved techniques for UPCON mitigation. According to such improved techniques, UPCON mitigation may be performed without unnecessarily modifying more than one waypoint in a data path between one or more affected mobile devices and a core network. In one embodiment, for example, an evolved node B (eNB) may comprise a processor circuit, a detection component for execution by the processor circuit to detect user plane congestion between an evolved universal mobile telecommunications system (UMTS) terrestrial radio access network (E-UTRAN) and a serving gateway (S-GW) of an evolved packet core (EPC), and a configuration component for execution by the processor circuit to select a set of user equipment (UEs) served by the E-UTRAN and the S-GW and send a request to utilize an alternate S-GW of the EPC to serve the set of UEs while maintaining a current packet data network (PDN) gateway (P-GW) for the set of UEs. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE ADV) technologies and/or standards, including their revisions, progeny and variants. Some embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies may also include without limitation any of the Institute of Electrical and Electronics Engineers (IEEE) 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants. The embodiments are not limited in this context.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments may be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an example of an operating environment 100 that may be representative of various embodiments. As shown in FIG. 1, a radio access network 102 comprises wireless communications cells A, B, and C. Wireless communications cells A, B, and C are served by respective base stations 104, 106, and 108. Each of base stations 104, 106, and 108 serves various mobile devices 110. In order to provide data service to the various mobile devices 110, radio access network 102 communicates with a serving gateway 120, which in turn communicates with a packet gateway 122.

In some embodiments, serving gateway 120 may comprise a network entity operative to route and/or forward user data packets for one or more mobile devices 110 in radio access network 102. In various embodiments, packet gateway 122 may comprise a network entity operative as a point of exit from and entry into an external packet data network for data exchanged between one or more mobile devices 110 in radio access network 102 and the external packet data network. In some embodiments, for example, packet gateway may provide data connectivity to the internet for one or more mobile devices 110 in radio access network 102. In various embodiments, serving gateway 120 and/or packet gateway 122 may comprise network devices and/or nodes of a core network. For example, in some embodiments, serving gateway 120 may comprise a serving gateway (S-GW) of an evolved packet core (EPC) structured according to a system architecture evolution (SAE) architecture, and packet gateway 122 may comprise a packet data network (PDN) gateway (P-GW) of the EPC. The embodiments are not limited to this example.

In various embodiments, base stations 104, 106, and 108 may be operative to communicate with serving gateway 120 via respective connections 112, 114, and 116 of a radio-to-packet interface 118. Radio-to-packet interface 118 may comprise any combination of network communications interfaces, connections, and/or devices operative to enable radio access network 102 to exchange user plane data with serving gateway 120. In some embodiments, for example, radio-to-packet interface 118 may comprise an interface that enables a 3GPP radio access network (RAN) to exchange user plane data with an S-GW of an EPC. In various embodiments, radio-to-packet interface 118 may include one or more intermediate network devices and/or nodes. In some embodiments, some or all of the one or more intermediate network devices and/or nodes may comprise intermediate packet routing devices and/or nodes. In various embodiments, one or more intermediate packet routing devices and/or nodes may enable radio access network 102 to exchange user plane data with serving gateway 120 when radio access network 102 operates according to a different protocol than serving gateway 120. For example, in some embodiments, radio-to-packet interface 118 may include a serving GPRS support node (SGSN) that enables the exchange of user plane data between a UMTS terrestrial radio access network (UTRAN) and an S-GW. The embodiments are not limited in this context.

In various embodiments, radio access network 102 may comprise a 4G radio access network. In an example embodiment, radio access network 102 may comprise an evolved UTRAN (E-UTRAN), base stations 104, 106, and 108 may comprise evolved node Bs (eNBs), serving gateway 120 may comprise an S-GW of an EPC, and connections 112, 114, and 116 may comprise S1-U interface connections between the eNBs and the S-GW. The embodiments are not limited to this example.

In some other embodiments, radio access network 102 may comprise a 3G or 2G radio access network. In various such embodiments, radio-to-packet interface 118 may include one or more intermediate network devices and/or nodes. In some embodiments, the one or more intermediate network devices and/or nodes may include one or more intermediate packet routing devices and/or nodes operative to enable the 3G or 2G radio access network to exchange user plane data with the serving gateway.

In an example embodiment, radio access network 102 may comprise a UTRAN, base stations 104, 106, and 108 may comprise node Bs, serving gateway 120 may comprise an S-GW of an EPC, and radio-to-packet interface 118 may include a radio network controller (RNC) and an SGSN. In this example embodiment, connections 112, 114, and 116 may comprise Iu-B interface connections between the node Bs and the RNC, and the RNC may communicate with the SGSN over an Iu-PS interface connection.

In another example embodiment, radio access network 102 may comprise a GSM/EDGE radio access network (GERAN), base stations 104, 106, and 108 may comprise base transceiver stations (BTSs), and radio-to-packet interface 118 may include a base station controller (BSC) and an SGSN. In this example embodiment, connections 112, 114, and 116 may comprise Abis interface connections between the BTSs and the BSC, and the BSC may communicate with the SGSN over a Gb interface connection. The embodiments are not limited to these examples.

In various embodiments, radio-to-packet interface 118 may have an associated uplink capacity and an associated downlink capacity, which may comprise overall rates at which radio-to-packet interface 118 can convey user plane data between radio access network 102 and serving gateway 120 in the uplink and downlink directions, respectively. In some embodiments, an uplink capacity of radio-to-packet interface 118 may be different than a downlink capacity of radio-to-packet interface 118, while in other embodiments, the uplink and downlink capacities of radio-to-packet interface 118 may be the same. The embodiments are not limited in this context.

In various embodiments, the uplink and/or downlink capacities of radio-to-packet interface 118 may be defined by and/or related to uplink and/or downlink capacities of one or more interfaces for connections to and/or within radio-to-packet interface 118. In an example embodiment, radio access network 102 may comprise an E-UTRAN, connections 112, 114, and 116 may comprise S1-U interface connections, and the uplink and/or downlink capacities of radio-to-packet interface 118 may comprise overall uplink and/or downlink S1-U interface capacities for radio-to-packet interface 118. In another example embodiment, radio access network 102 may comprise a UTRAN, radio-to-packet interface 118 may include an RNC that communicates with an SGSN over an Iu-PS interface connection, and the uplink and/or downlink capacities of radio-to-packet interface 118 may comprise overall uplink and/or downlink Iu-PS interface capacities for radio-to-packet interface 118. In yet another example embodiment, radio access network 102 may comprise a GERAN, radio-to-packet interface 118 may include a BSC that communicates with an SGSN over a Gb interface connection, and the uplink and/or downlink capacities of radio-to-packet interface 118 may comprise overall uplink and/or downlink Gb interface capacities for radio-to-packet interface 118. The embodiments are not limited to these examples.

In some embodiments, when the sums of the uplink and/or downlink user plane data rates of connections 112, 114, and 116 approach, reach, and/or exceed the uplink and/or downlink capacity of radio-to-packet interface 118, user plane congestion may result. For example, if radio-to-packet interface 118 has an uplink capacity of 100 Mbps and base stations 104, 106, and 108 attempt to send user plane data to serving gateway 120 through respective connections 112, 114, and 116 at a collective total rate of 105 Mbps, uplink user plane congestion may occur in radio-to-packet interface 118. The embodiments are not limited to this example.

In order to reduce, eliminate, and/or prevent user plane congestion in radio-to-packet interface 118, user plane congestion (UPCON) mitigation techniques may be employed. According to such UPCON mitigation techniques, an alternate radio-to-packet interface may be used to accommodate some of the uplink and/or downlink user plane traffic for radio access network 102, in order to reduce and/or prevent uplink and/or downlink user plane congestion in radio-to-packet interface 118. In various embodiments, utilizing such an alternate radio-to-packet interface may involve allocating some of the uplink and/or downlink user plane traffic of radio access network 102 for communication via an alternate serving gateway. In some embodiments, utilizing such an alternate radio-to-packet interface may alternatively or additionally involve allocating some of the uplink and/or downlink user plane traffic of radio access network 102 for communication via an alternative to an intermediate device or node within radio-to-packet interface 118. For example, in embodiments in which radio-to-packet interface 118 includes an SGSN, utilizing an alternate radio-to-packet interface may comprise allocating some or all of the uplink and/or downlink user plane traffic of radio access network 102 for communication via an alternate SGSN. The embodiments are not limited to this example.

In various embodiments, the UPCON mitigation techniques may involve modifying one waypoint in a data path between radio access network 102 and packet gateway 122 while maintaining one or more other waypoints in the data path. For example, in some embodiments, some or all of the uplink and/or downlink user plane traffic of radio access network 102 may be allocated to an alternate serving gateway while packet gateway 122 is maintained for handling of that user plane traffic. In various other embodiments, some or all of the uplink and/or downlink user plane traffic of radio access network 102 may be allocated to an alternate SGSN within radio-to-packet interface 118 while serving gateway 120 and packet gateway 122 are maintained for handling of that user plane traffic. One advantage of some embodiments may be that by avoiding unnecessary changes to data path waypoints other than those at which user plane congestion occurs, UPCON mitigation may be performed with reduced signaling overhead. Other advantages may be associated with various embodiments, and the embodiments are not limited in this context.

It is worthy of note that in some embodiments, such UPCON mitigation may involve allocating user plane traffic to an alternate radio-to-packet interface at a mobile device level of granularity. As such, in various embodiments, UPCON mitigation may involve allocating uplink and/or downlink user plane traffic of particular mobile devices 110 in a given cell to an alternate radio-to-packet interface, and continuing to use radio-to-packet interface 118 to handle uplink and/or downlink user plane traffic of other mobile devices 110 in that cell. It is to be understood that in some embodiments, other levels of granularity may additionally or alternatively be employed. In various embodiments, the particular mobile devices 110 may be selected only from among those that are in a connected mode. The embodiments are not limited in this context.

In some embodiments, any particular UPCON mitigation process may be initiated by one of base stations 104, 106, and 108. For example, in various embodiments, an UPCON mitigation process may be initiated by an eNB. In some embodiments, any particular UPCON mitigation process may be initiated by an intermediate network device or node within radio-to-packet interface 118, or another network device or node with which radio access network 102 communicates. For example, in various embodiments, an UPCON mitigation process may be initiated by an RNC, a BSC, an SGSN, or a mobility management entity (MME). In some embodiments, more than one of the aforementioned devices may be capable of initiating an UPCON mitigation process. For example, in various embodiments, each of base stations 104, 106, and 108 may comprise an eNB capable of initiating UPCON mitigation, and radio access network 102 may communicate with an MME that is also capable of initiating UPCON mitigation. The embodiments are not limited to this example.

Figure 2:
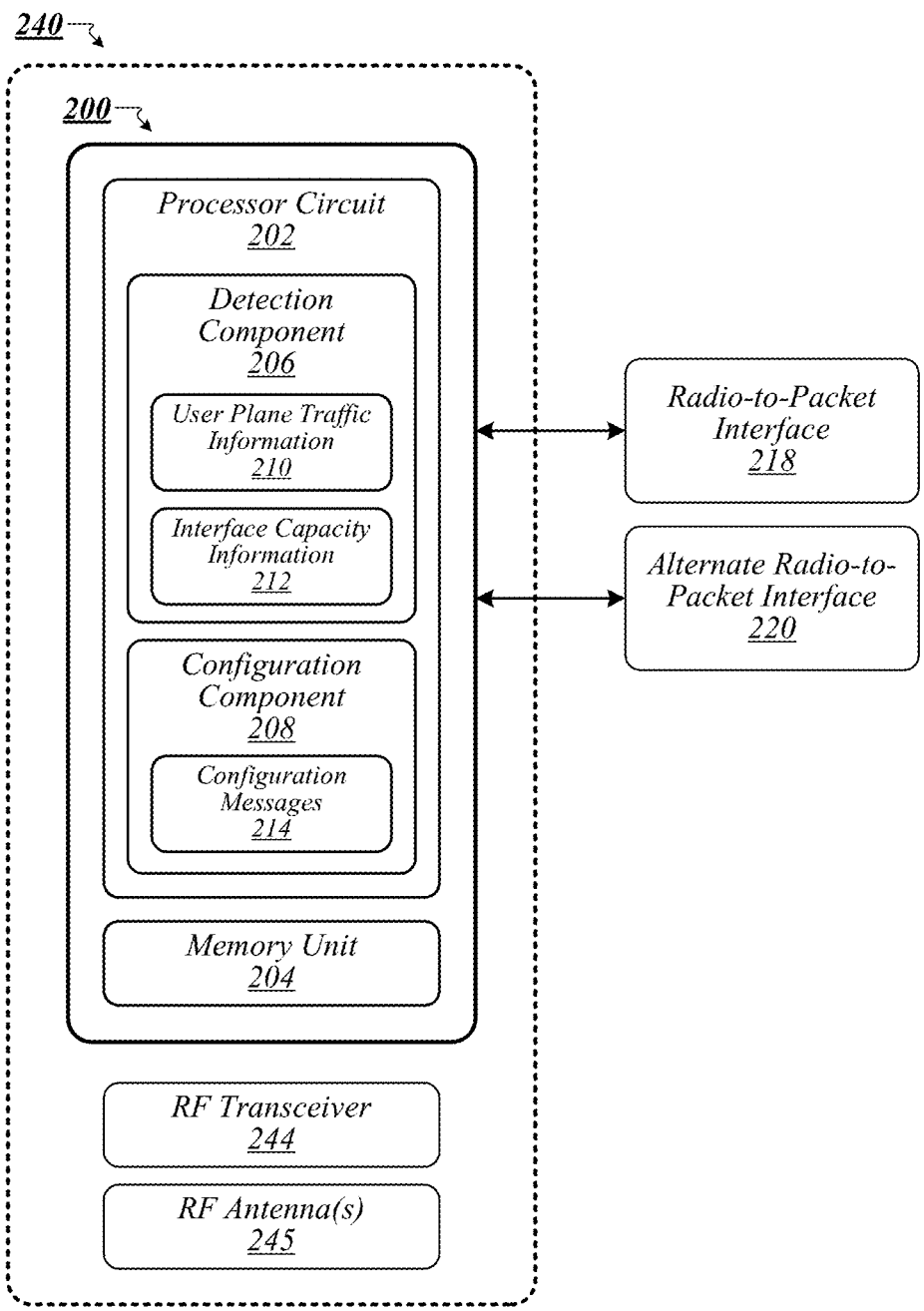
FIG. 2 illustrates one embodiment of an apparatus and one embodiment of a first system.

FIG. 2 illustrates a block diagram of an apparatus 200 comprising an example of a network device or node that may be capable of initiating UPCON mitigation in an operating environment such as example operating environment 100 of FIG. 1. Examples of apparatus 200 may include an eNB, an RNC, a BSC, an SGSN, and an MME. The embodiments are not limited to these examples. Furthermore, the embodiments are not limited to the type, number, or arrangement of elements shown in FIG. 2.

In some embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In various embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

FIG. 2 also illustrates a block diagram of a system 240. System 240 may comprise any of the aforementioned elements of apparatus 200. System 240 may further comprise a radio frequency (RF) transceiver 244 and one or more RF antennas 245. RF transceiver 244 may include one or more radios capable of transmitting and receiving signals using various suitable wireless communications techniques. Such techniques may involve communications across one or more wireless networks, such as any of the aforementioned example wireless networks, according to one or more wireless communications technologies and/or standards, such as any of the aforementioned example wireless communications technologies and/or standards. Examples of RF antennas 245 may include internal antennas, omni-directional antennas, monopole antennas, dipole antennas, end-fed antennas, circularly polarized antennas, micro-strip antennas, diversity antennas, dual antennas, tri-band antennas, quad-band antennas, and so forth. The embodiments are not limited to these examples.

In general operation, apparatus 200 and/or system 240 may be operative to monitor a radio-to-packet interface 218 in order to detect downlink and/or uplink user plane congestion therein. Radio-to-packet interface 218 may be the same as or similar to radio-to-packet interface 118 of FIG. 1. In various embodiments, when apparatus 200 and/or system 240 detects downlink and/or uplink user plane congestion in radio-to-packet interface 218, it may be operative to initiate UPCON mitigation. In some embodiments, the UPCON mitigation may involve allocating some of the uplink and/or downlink user plane traffic of a radio access network for communication via an alternate serving gateway. In various embodiments, the UPCON mitigation may alternatively or additionally involve allocating some of the uplink and/or downlink user plane traffic of a radio access network for communication via an alternative to an intermediate network device or node, such as an alternate SGSN. The embodiments are not limited in this context.

In some embodiments, apparatus 200 and/or system 240 may be operative to initiate UPCON mitigation that comprises maintaining a current serving gateway and/or a current packet gateway associated with radio-to-packet interface 218. In an example embodiment, the UPCON mitigation may comprise maintaining a current packet gateway, such that user plane traffic allocated to an alternate serving gateway is still handled by the current packet gateway. In another example embodiment, the UPCON mitigation may comprise maintaining a current serving gateway, such that user plane traffic allocated to an alternate SGSN is still handled by the current serving gateway. The embodiments are not limited to these examples.

In various embodiments, apparatus 200 and/or system 240 may comprise a detection component 206. Detection component 206 may comprise logic, circuitry, and/or instructions operative to monitor radio-to-packet interface 218 in order to detect uplink and/or downlink user plane congestion therein. In some embodiments, detection component 206 may be operative to monitor radio-to-packet interface 218 based on user plane traffic information 210. User plane traffic information 210 may comprise information indicating amounts of uplink and/or downlink user plane traffic allocated for handling by radio-to-packet interface 218 and/or by a network device or node associated therewith. In an example embodiment, apparatus 200 and/or system 240 may comprise an eNB or MME, and user plane traffic information 210 may comprise information indicating amounts of uplink and/or downlink S1-U interface traffic allocated for handling by an S-GW. In another example embodiment, apparatus 200 and/or system 240 may comprise an RNC or an SGSN, and user plane traffic information 210 may comprise information indicating amounts of uplink and/or downlink Iu-PS interface traffic allocated for handling by the SGSN. In yet another example embodiment, apparatus 200 and/or system 240 may comprise a BSC or an SGSN, and user plane traffic information 210 may comprise information indicating amounts of uplink and/or downlink Gb interface traffic allocated for handling by the SGSN. The embodiments are not limited to these examples.

In various embodiments, detection component 206 may be operative to detect uplink and/or downlink user plane congestion in radio-to-packet interface 218 based on user plane traffic information 210 and interface capacity information 212. Interface capacity information 212 may comprise information indicating an uplink capacity and/or a downlink capacity for radio-to-packet interface 218, which may comprise overall rates at which radio-to-packet interface 218 can convey user plane data in the uplink and downlink directions, respectively. In some embodiments, an uplink capacity of radio-to-packet interface 218 may be different than a downlink capacity of radio-to-packet interface 218, while in other embodiments, the uplink and downlink capacities of radio-to-packet interface 218 may be the same. The embodiments are not limited in this context.

In various embodiments, interface capacity information 212 may comprise information indicating uplink and/or downlink capacities of one or more interfaces for connections to and/or within radio-to-packet interface 218. In an example embodiment, radio-to-packet interface 218 may connect an E-UTRAN with an evolved packet core, and interface capacity information 212 may indicate uplink and/or downlink S1-U interface capacities for an S-GW of the evolved packet core. In another example embodiment, radio-to-packet interface 218 may include an SGSN and may connect a UTRAN with an evolved packet core, and interface capacity information 212 may indicate uplink and/or downlink Iu-PS interface capacities for the SGSN. In yet another example embodiment, radio-to-packet interface 218 may include an SGSN and may connect a GERAN with an evolved packet core, and interface capacity information 212 may indicate uplink and/or downlink Gb interface capacities for the SGSN. The embodiments are not limited to these examples.

In some embodiments, detection component 206 may be operative to detect uplink and/or downlink user plane congestion by comparing uplink and/or downlink user plane traffic levels indicated by user plane traffic information 210 with uplink and/or downlink capacities indicated by interface capacity information 212. In various embodiments, detection component 206 may be operative to detect user plane congestion in a particular direction when the user plane traffic level in that direction nears the capacity for that direction. For example, detection component 206 may be operative to detect user plane congestion in a particular direction when the user plane traffic level in that direction reaches a certain percentage of the capacity or increases to a level that is within a particular number of Mbps of the capacity. In some other embodiments, detection component 206 may be operative to detect user plane congestion in a particular direction when the user plane traffic level in that direction reaches or exceeds the capacity for that direction. The embodiments are not limited in this context.

In various embodiments, apparatus 200 and/or system 240 may comprise a configuration component 208. Configuration component 208 may comprise logic, circuitry, and/or instructions operative to initiate and/or implement UPCON mitigation techniques to reduce, eliminate, and/or prevent uplink and/or downlink user plane congestion in radio-to-packet interface 218. In some embodiments, when detection component 206 detects uplink and/or downlink user plane congestion in radio-to-packet interface 218, configuration component 208 may be operative to exchange one or more configuration messages 214 with one or more network devices and/or nodes in order to initiate and/or implement UPCON mitigation. In various embodiments, the UPCON mitigation may comprise configuring one or more network devices and/or nodes in order to use an alternate radio-to-packet interface 220 to accommodate some of the uplink and/or downlink user plane traffic currently allocated to radio-to-packet interface 218.

In some embodiments, configuration component 208 may be operative to exchange one or more configuration messages 214 to directly configure one or more network devices and/or nodes in conjunction with UPCON mitigation. In an example embodiment, configuration component 208 is comprised in an MME and exchanges configuration messages 214 with an eNB in order to configure the eNB to use an alternate S-GW for some user plane data in conjunction with UPCON mitigation. In various embodiments, configuration component 208 may alternatively or additionally be operative to exchange one or more configuration messages 214 to indirectly configure one or more network devices and/or nodes by causing a different device and/or node to perform the direct configuration. In an example embodiment, configuration component 208 is comprised in an eNB and exchanges configuration messages 214 with an MME in order to cause the MME to configure an alternate S-GW to handle some of the user plane data of the eNB in conjunction with UPCON mitigation. The embodiments are not limited to these examples.

In some embodiments, the one or more configured network devices and/or nodes may include devices and/or nodes located in an uplink direction with respect to apparatus 200 and/or system 240, located in a downlink direction with respect to apparatus 200 and/or system 240, or both. Additionally, in various embodiments, apparatus 200 and/or system 240 may comprise one of the one or more configured network devices and/or nodes. Examples of network devices and/or nodes that configuration component 208 may be operative to directly and/or indirectly configure include an eNB, an MME, a serving gateway, a packet gateway, an RNC, a BSC, and an SGSN. The embodiments are not limited to these examples.

In some embodiments, configuration component 208 may be operative to initiate and/or implement an UPCON mitigation technique that comprises maintaining a current serving gateway and/or a current packet gateway associated with radio-to-packet interface 218. In an example embodiment, configuration component 208 may be operative to directly and/or indirectly configure one or more network devices and/or nodes such that some uplink and/or downlink user plane traffic is allocated to an alternate serving gateway but still handled by a current packet gateway. In another example embodiment, configuration component 208 may be operative to directly and/or indirectly configure one or more network devices and/or nodes such that some uplink and/or downlink user plane traffic is allocated to an alternate SGSN but still handled by a current serving gateway. The embodiments are not limited to these examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
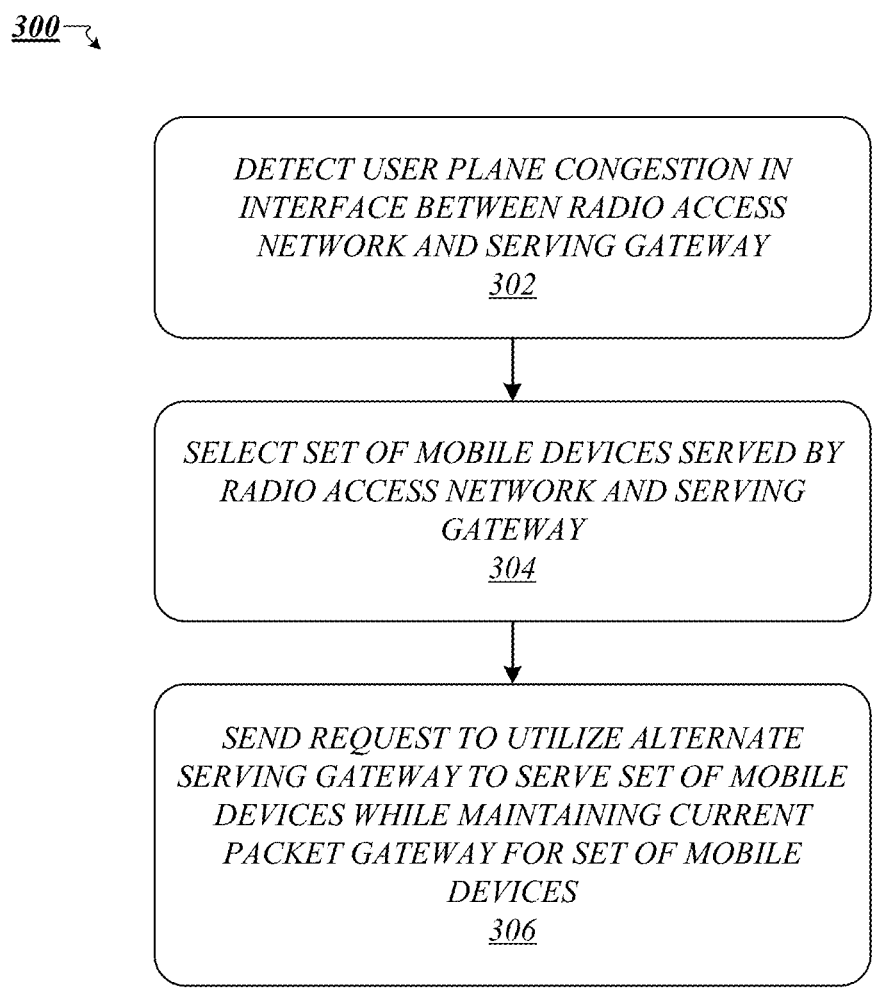
FIG. 3 illustrates one embodiment of a first logic flow.

FIG. 3 illustrates one embodiment of a logic flow 300, which may be representative of the operations executed by one or more embodiments described herein. More particularly, logic flow 300 may comprise an example of operations that apparatus 200 and/or system 240 of FIG. 2 may perform in conjunction with an UPCON mitigation process that comprises selecting an alternate serving gateway while maintaining a current packet gateway. As shown in logic flow 300, user plane congestion may be detected in an interface between a radio access network and a serving gateway at 302. For example, detection component 206 of FIG. 2 may detect user plane congestion within radio-to-packet interface 218, based on user plane traffic information 210 and interface capacity information 212. In various embodiments, the detected user plane congestion may comprise uplink congestion, downlink congestion, or both.

At 304, a set of mobile devices served by the radio access network and the serving gateway may be selected. For example, configuration component 208 of FIG. 2 may select a set of mobile devices served by a radio access network and a serving gateway that are connected by radio-to-packet interface 218. As used herein in conjunction with the performance of a selection, the term "set" denotes a group of one or more. In some embodiments, the mobile devices may be selected from among those served by a particular base station of the radio access network. At 306, a request may be sent to utilize an alternate serving gateway to serve the set of mobile devices while maintaining a current packet gateway for the set of mobile devices. For example, configuration component 208 of FIG. 2 may send a configuration message 214 comprising a request that user plane data of its selected set of mobile devices be handled by an alternate serving gateway and a current packet gateway. The embodiments are not limited to these examples.

FIG. 4A illustrates one embodiment 400 of a second operating environment comprising an example of an environment in which logic flow 300 of FIG. 3 may be performed. In the operating environment of FIG. 4A, an E-UTRAN interfaces with an evolved packet core. As shown in FIG. 4A, a cell 401 is served by an eNB 402, and contains user equipment (UEs) 404, 406, and 408. eNB 402 communicates with an MME 410 over an S1-MME interface connection 412, and exchanges user plane data of UEs 404, 406, and 408 with a current S-GW 414 over an S1-U interface connection 416. In turn, current S-GW 414 exchanges user plane data of UEs 404, 406, and 408 with a current P-GW 418, which communicates with a packet data network such as the internet. Additional eNBs 420 also exchange user plane data with current S-GW 414, over additional S1-U interface connections 422. If the collective uplink and/or downlink user plane data rates of S1-U interface connections 416 and 422 approach, reach, and/or exceed uplink and/or downlink S1-U interface capacities for current S-GW 414, uplink and/or downlink S1-U interface congestion may result. In order to reduce, eliminate, and/or prevent such congestion, uplink and/or downlink user plane traffic of one or more of UEs 404, 406, and 408 may be allocated for handling by an alternate S-GW.

FIG. 4B illustrates a second embodiment 450 of the operating environment discussed with respect to FIG. 4A. As shown in FIG. 4B, eNB 402 may have the ability to exchange user plane data with an alternate S-GW 424 over an S1-U interface connection 426. In order to reduce, eliminate, and/or prevent uplink and/or downlink S1-U interface congestion at current S-GW 414, uplink and/or downlink user plane traffic of one or more selected UEs of cell 401 may be allocated for handling by alternate S-GW 424 via S1-U interface connection 426. In the example of FIG. 4B, the uplink and/or downlink user plane traffic of selected UEs 406 and 408 may be allocated for handling by alternate S-GW 424 via S1-U interface connection 426, while current S-GW 414 may continue to handle the uplink and/or downlink user plane traffic of UE 404. Furthermore, current P-GW 418 continues to handle the uplink and/or downlink user plane traffic of selected UEs 406 and 408, as well as that of UE 404. The embodiments are not limited in this context.

Figure 5:
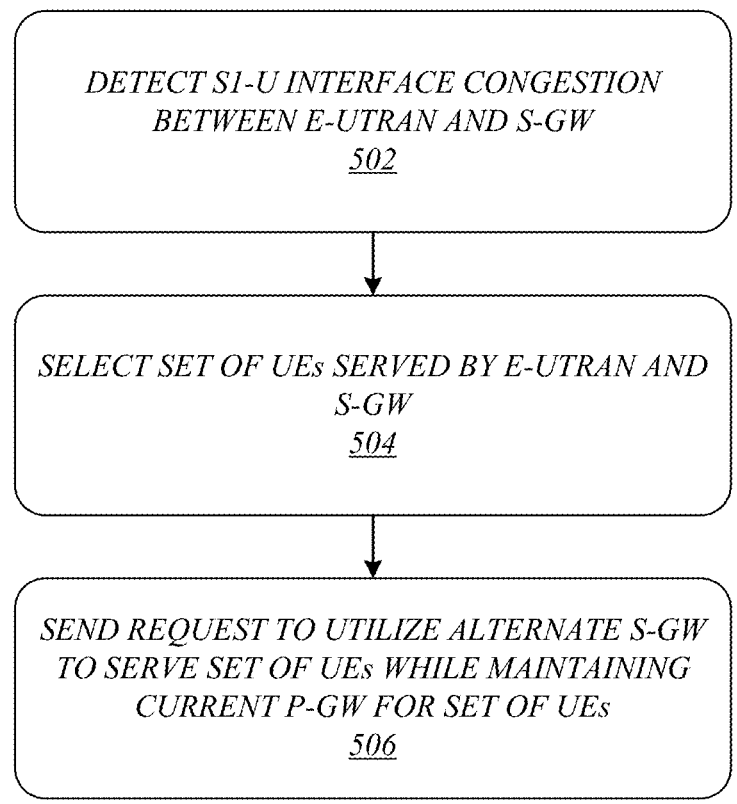
FIG. 5 illustrates one embodiment of a second logic flow.

FIG. 5 illustrates one embodiment of a logic flow 500. Logic flow 500 may comprise an example of operations that apparatus 200 and/or system 240 of FIG. 2 may perform in conjunction with UPCON mitigation in an operating environment such as that of FIG. 4B. As shown in FIG. 5, S1-U interface congestion between an E-UTRAN and an S-GW may be detected at 502. For example, radio-to-packet interface 218 of FIG. 2 may connect an E-UTRAN with an S-GW via an S1-U interface, and detection component 206 of FIG. 2 may detect congestion in the S1-U interface based on user plane traffic information 210 and interface capacity information 212. At 504, a set of UEs served by the E-UTRAN and the S-GW may be selected. For example, configuration component 208 of FIG. 2 may select a set of UEs served by the E-UTRAN and the S-GW that are connected by radio-to-packet interface 218. In various embodiments, the UEs may be selected from among those served by a particular eNB of the E-UTRAN. At 506, a request may be sent to utilize an alternate S-GW to serve the set of UEs while maintaining a current P-GW for the set of UEs. For example, configuration component 208 of FIG. 2 may send a configuration message 214 comprising a request that its selected set of UEs be served by an alternate S-GW that connects to the E-UTRAN via alternate radio-to-packet interface 220, while maintaining a current P-GW for the set of UEs. The embodiments are not limited to these examples.

Figure 6:
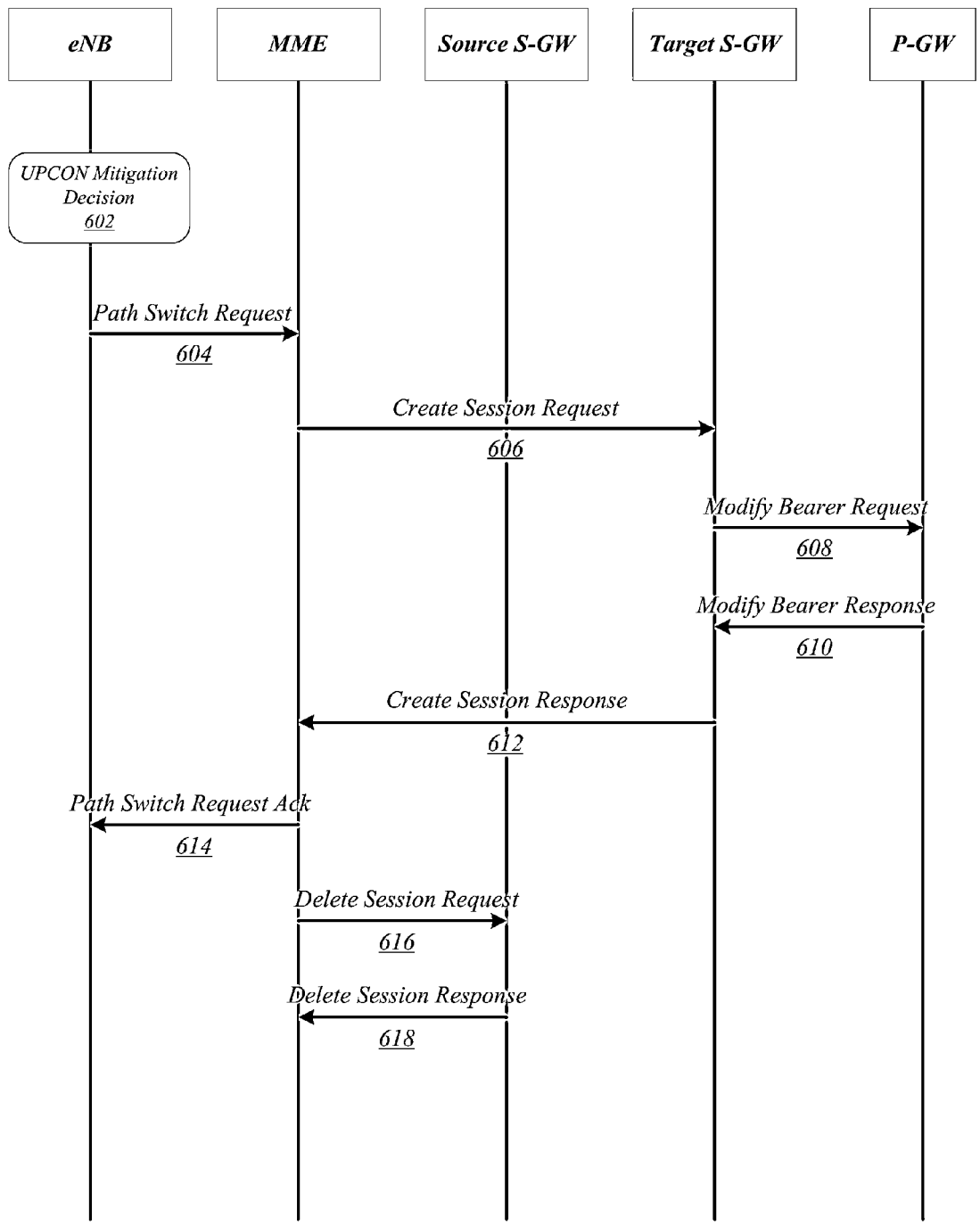
FIG. 6 illustrates one embodiment of a first communications flow.

FIG. 6 illustrates an embodiment of a communications flow 600 that comprises examples of communications that may be exchanged by various network devices and/or nodes in some embodiments. More particularly, communications flow 600 illustrates example communications that may be exchanged in various embodiments in which an eNB of an E-UTRAN initiates UPCON mitigation. At 602, the eNB may elect to initiate UPCON mitigation. In some embodiments, the eNB may elect to initiate UPCON mitigation because the uplink and/or downlink user plane traffic of an S1-U interface between the E-UTRAN and a source S-GW has neared, reached, or exceeded uplink and/or downlink capacities of the S1-U interface. In conjunction with electing to initiate UPCON mitigation, the eNB may select a set of UEs in its cell that are served by the source S-GW and that are to be reassigned to a target S-GW for service. In various embodiments, the eNB may select the set of UEs only from among UEs that are in a connected mode.

At 604, the eNB may send a Path Switch Request to an MME of the E-UTRAN. In some embodiments, the Path Switch Request may comprise one or more information elements indicating that S1-U interface UPCON mitigation is being performed for the source S-GW. In various embodiments, the Path Switch Request may comprise one or more information elements indicating whether the S1-U interface UPCON mitigation is being performed with respect to the uplink direction, the downlink direction, or both. In some embodiments, the Path Switch Request may comprise one or more additional information elements. In various embodiments, the one or more additional information elements may comprise, for example, an S1-MME address for the eNB; an international mobile subscriber identity (IMSI) for each impacted UE; an access point name (APN) and/or linked evolved packet system (EPS) bearer identifier (ID) for each affected PDN connection; and/or an EPS bearer ID and/or eNB S1-U address for each affected EPS bearer. In some embodiments, the eNB S1-MME address and/or the eNB S1-U addresses may comprise a fully qualified tunnel endpoint identifier (F-TEID) format. Although the F-TEID format shall not be mentioned in the remaining discussion for purposes of brevity, it is to be understood that the F-TEID format may be used for any or all of the other device addresses discussed below with respect to communications flow 600, as well as those discussed with respect to the other communications flows discussed herein. The embodiments are not limited in this context.

Upon receipt of the Path Switch Request, the MME may select as the target S-GW an S-GW for which an S1-U interface to the eNB is uncongested. In various embodiments, the MME may perform this selection based on user plane traffic information for the target S-GW, such as user plane traffic information 210 of FIG. 2. Then, at 606, the MME may send a Create Session Request to the target S-GW. In some embodiments, the Create Session Request may comprise one or more information elements indicating that S1-U interface UPCON mitigation is being performed for the source S-GW. In various embodiments, the Create Session Request may comprise one or more information elements indicating whether the S1-U interface UPCON mitigation is being performed with respect to the uplink direction, the downlink direction, or both. In some embodiments, the Create Session Request may comprise one or more additional information elements. In various embodiments, the one or more additional information elements may comprise, for example, an S11 address for the MME; an IMSI for each impacted UE; an APN, linked EPS bearer ID, and/or P-GW S5/S8 control plane or proxy mobile IPv6 (PMIP) address for each affected PDN connection; and/or an EPS bearer ID and/or eNB S1-U address for each affected EPS bearer. The embodiments are not limited in this context.

After receiving the Create Session Request, the target S-GW may send a Modify Bearer Request to a P-GW that supports PDN connections of the selected set of UEs at 608. It is to be understood that although example communications flow 600 illustrates a single P-GW, embodiments are both possible and contemplated in which Modify Bearer Requests are sent to multiple affected P-GWs, and the embodiments are not limited in this context. In some embodiments, the Modify Bearer Request may comprise one or more information elements indicating that S1-U interface UPCON mitigation is being performed for the source S-GW. In various embodiments, the Modify Bearer Request may comprise one or more information elements indicating whether the S1-U interface UPCON mitigation is being performed with respect to the uplink direction, the downlink direction, or both. In some embodiments, the Modify Bearer Request may comprise one or more additional information elements. In various embodiments, the one or more additional information elements may comprise, for example, a control plane address for the target S-GW; an IMSI for each impacted UE; an APN and/or linked EPS bearer ID for each affected PDN connection; and/or an EPS bearer ID and/or target S-GW S5/S8 user plane address for each affected EPS bearer. The embodiments are not limited in this context.

At 610, in response to receiving the Modify Bearer Request, the P-GW may modify the associated EPS bearer information for each PDN connection of the impacted UEs of the Modify Bearer Request and send a Modify Bearer Response to the target S-GW. As noted above, although communications flow 600 illustrates a single P-GW, there may be multiple affected P-GWs in some embodiments, and thus the target S-GW may receive multiple Modify Bearer Responses at 610. In various embodiments, the Modify Bearer Response may comprise one or more information elements including, for example, an S5/S8 control plane address for the P-GW; an IMSI for each impacted UE; an APN and/or linked EPS bearer ID for each affected PDN connection; and/or an EPS bearer ID and/or P-GW S5/S8 user plane address for each affected EPS bearer. The embodiments are not limited in this context.

At 612, the target S-GW may send a Create Session Response to the MME. In some embodiments, the Create Session Response may comprise one or more information elements including, for example, an S11 address for the target S-GW; an IMSI for each impacted UE; an APN and/or linked EPS bearer ID for each affected PDN connection; and/or an EPS bearer ID and/or target S-GW S1-U user plane address for each affected EPS bearer. The embodiments are not limited in this context.

At 614, the MME may send a Path Switch Request Acknowledgement to the eNB. In various embodiments, the Path Switch Request Acknowledgement may comprise one or more information elements including, for example, an S1-MME address of the MME; an IMSI for each impacted UE; an APN and/or linked EPS bearer ID for each affected PDN connection; and/or an EPS bearer ID and/or target S-GW S1-U user plane address for each affected EPS bearer. In some embodiments, the eNB may modify the affected UEs' EPS bearer information after receiving the Path Switch Request Acknowledgement. The embodiments are not limited in this context.

At 616, the MME may send a Modify Bearer Request or Delete Session Request to the source S-GW, in order to remove the affected UEs' EPS bearer information. In various embodiments, the Modify Bearer Request or Delete Session Request may comprise one or more information elements indicating whether the affected UEs' S1-U traffic has been removed in the uplink direction, the downlink direction, or both. In some embodiments, the Modify Bearer Request or Delete Session Request may comprise one or more additional information elements indicating, for example, an IMSI for each impacted UE; and/or an APN and/or linked EPS bearer ID for each affected PDN connection. At 618, in response to the Modify Bearer Request or Delete Session Request, the source S-GW may send a Modify Bearer Response or Delete Session Response to the MME. In various embodiments, the MME and the S-GW may be operative to exchange a Modify Bearer Request at 616 and a Modify Bearer Response at 618 if the UPCON mitigation is performed with respect to only the uplink direction or only the downlink direction. The embodiments are not limited in this context.

Figure 7:
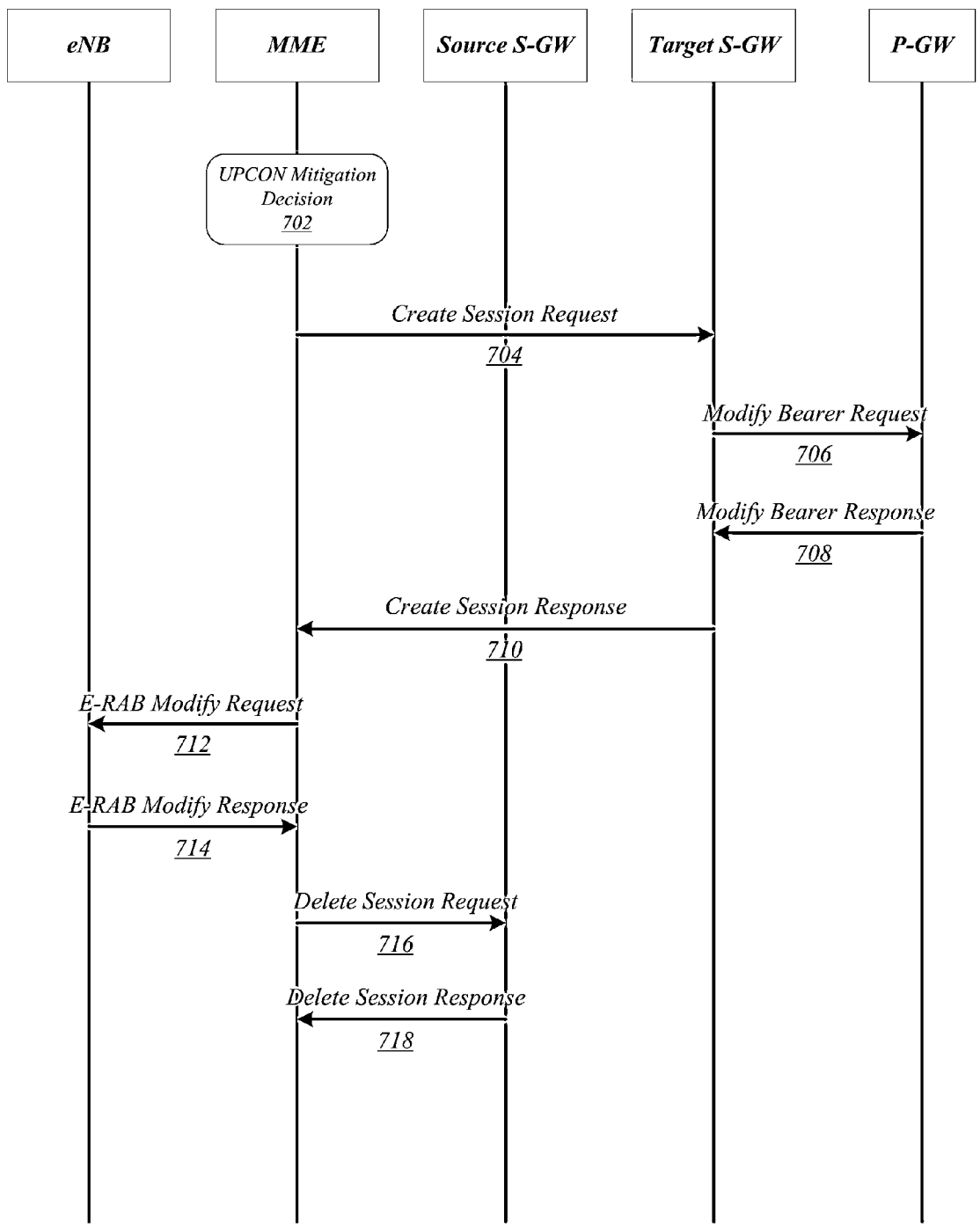
FIG. 7 illustrates one embodiment of a second communications flow.

FIG. 7 illustrates an embodiment of a communications flow 700 that comprises examples of communications that may be exchanged by various network devices and/or nodes in some embodiments. More particularly, communications flow 700 illustrates example communications that may be exchanged in various embodiments in which an MME of an E-UTRAN initiates UPCON mitigation. At 702, the MME may elect to initiate UPCON mitigation. In some embodiments, the MME may elect to initiate UPCON mitigation because the uplink and/or downlink user plane traffic of an S1-U interface between the E-UTRAN and a source S-GW has neared, reached, or exceeded uplink and/or downlink capacities of the S1-U interface. In conjunction with electing to initiate UPCON mitigation, the MME may select, from among the UEs in a cell of an eNB, a set of UEs that are served by the source S-GW and that are to be reassigned to a target S-GW for service. In various embodiments, the MME may select the set of UEs only from among UEs in the cell that are in a connected mode. In some embodiments, the MME may select as the target S-GW an S-GW for which an S1-U interface to the eNB is uncongested. In various embodiments, the MME may perform this selection based on user plane traffic information for the target S-GW, such as user plane traffic information 210 of FIG. 2.

At 704, the MME may then send a Create Session Request to the target S-GW. In some embodiments, the Create Session Request may comprise one or more information elements indicating that S1-U interface UPCON mitigation is being performed for the source S-GW. In various embodiments, the Create Session Request may comprise one or more information elements indicating whether the S1-U interface UPCON mitigation is being performed with respect to the uplink direction, the downlink direction, or both. In some embodiments, the Create Session Request may comprise one or more additional information elements. In various embodiments, the one or more additional information elements may comprise, for example, an S11 address for the MME; an IMSI for each impacted UE; an APN, linked EPS bearer ID, and/or P-GW S5/S8 control plane or PMIP address for each affected PDN connection; and/or an EPS bearer ID for each affected EPS bearer. The embodiments are not limited in this context.

At 706, the target S-GW may modify the affected UEs' EPS bearer information based on the Create Session Request and then send a Modify Bearer Request to a P-GW that supports PDN connections of the affected UEs. It is to be understood that although example communications flow 700 illustrates a single P-GW, embodiments are both possible and contemplated in which Modify Bearer Requests are sent to multiple affected P-GWs, and the embodiments are not limited in this context. In some embodiments, the Modify Bearer Request may comprise one or more information elements indicating that S1-U interface UPCON mitigation is being performed for the source S-GW. In various embodiments, the Modify Bearer Request may comprise one or more information elements indicating whether the S1-U interface UPCON mitigation is being performed with respect to the uplink direction, the downlink direction, or both. In some embodiments, the Modify Bearer Request may comprise one or more additional information elements. In various embodiments, the one or more additional information elements may comprise, for example, a control plane address for the target S-GW; an IMSI for each impacted UE; an APN and/or linked EPS bearer ID for each affected PDN connection; and/or an EPS bearer ID and/or target S-GW S5/S8 user plane address for each affected EPS bearer. The embodiments are not limited in this context.

At 708, in response to receiving the Modify Bearer Request, a P-GW may modify the associated EPS bearer information for each PDN connection of the impacted UEs of the Modify Bearer Request and send a Modify Bearer Response to the target S-GW. As noted above, although communications flow 700 illustrates a single P-GW, there may be multiple affected P-GWs in some embodiments, and thus the target S-GW may receive multiple Modify Bearer Responses at 708. In various embodiments, the Modify Bearer Response may comprise one or more information elements including, for example, an S5/S8 control plane address for the P-GW; an IMSI for each impacted UE; an APN and/or linked EPS bearer ID for each affected PDN connection; and/or an EPS bearer ID and/or P-GW S5/S8 user plane address for each affected EPS bearer. The embodiments are not limited in this context.

At 710, the target S-GW may send a Create Session Response to the MME. In some embodiments, the Create Session Response may comprise one or more information elements including, for example, an S11 address for the target S-GW; an IMSI for each impacted UE; an APN and/or linked EPS bearer ID for each affected PDN connection; and/or an EPS bearer ID and/or target S-GW S1-U user plane address for each affected EPS bearer. The embodiments are not limited in this context.

At 712, the MME may send an E-UTRAN radio access bearer (E-RAB) Modify Request to the eNB. In various embodiments, the E-RAB Modify Request may comprise one or more information elements indicating that S1-U interface UPCON mitigation is being performed for the source S-GW. In some embodiments, the E-RAB Modify Request may comprise one or more information elements indicating whether the S1-U interface UPCON mitigation is being performed with respect to the uplink direction, the downlink direction, or both. In various embodiments, the E-RAB Modify Request may comprise one or more additional information elements. In some embodiments, the one or more additional information elements may comprise, for example, an S1-MME address for the MME; an IMSI for each impacted UE; an APN and/or linked EPS bearer ID for each affected PDN connection; and/or an EPS bearer ID and/or target S-GW S1-U user plane address for each affected EPS bearer. The embodiments are not limited in this context.

Upon receiving the E-RAB Modify Request from the MME, the eNB may modify the EPS bearer information for the affected UEs. Then, at 714, the eNB may send an E-RAB Modify Response to the MME in response to the E-RAB Modify Request. In various embodiments, the E-RAB Modify Response may comprise one or more information elements including, for example, an S1-MME address for the eNB; an IMSI for each impacted UE; an APN and/or linked EPS bearer ID for each affected PDN connection; and/or an EPS bearer ID and/or eNB S1-U address for each affected EPS bearer. The embodiments are not limited in this context.

At 716, the MME may send a Modify Bearer Request or Delete Session Request to the source S-GW, in order to remove the affected UEs' EPS bearer information. In some embodiments, the Modify Bearer Request or Delete Session Request may comprise one or more information elements indicating whether the affected UEs' S1-U traffic has been removed in the uplink direction, the downlink direction, or both. In various embodiments, the Modify Bearer Request or Delete Session Request may comprise one or more additional information elements indicating, for example, an IMSI for each impacted UE; and/or an APN and/or linked EPS bearer ID for each affected PDN connection. At 718, in response to the Modify Bearer Request or Delete Session Request, the source S-GW may send a Modify Bearer Response or Delete Session Response to the MME. In some embodiments, the MME and the S-GW may be operative to exchange a Modify Bearer Request at 716 and a Modify Bearer Response at 718 if the UPCON mitigation is performed with respect to only the uplink direction or only the downlink direction. The embodiments are not limited in this context.

Figure 8:
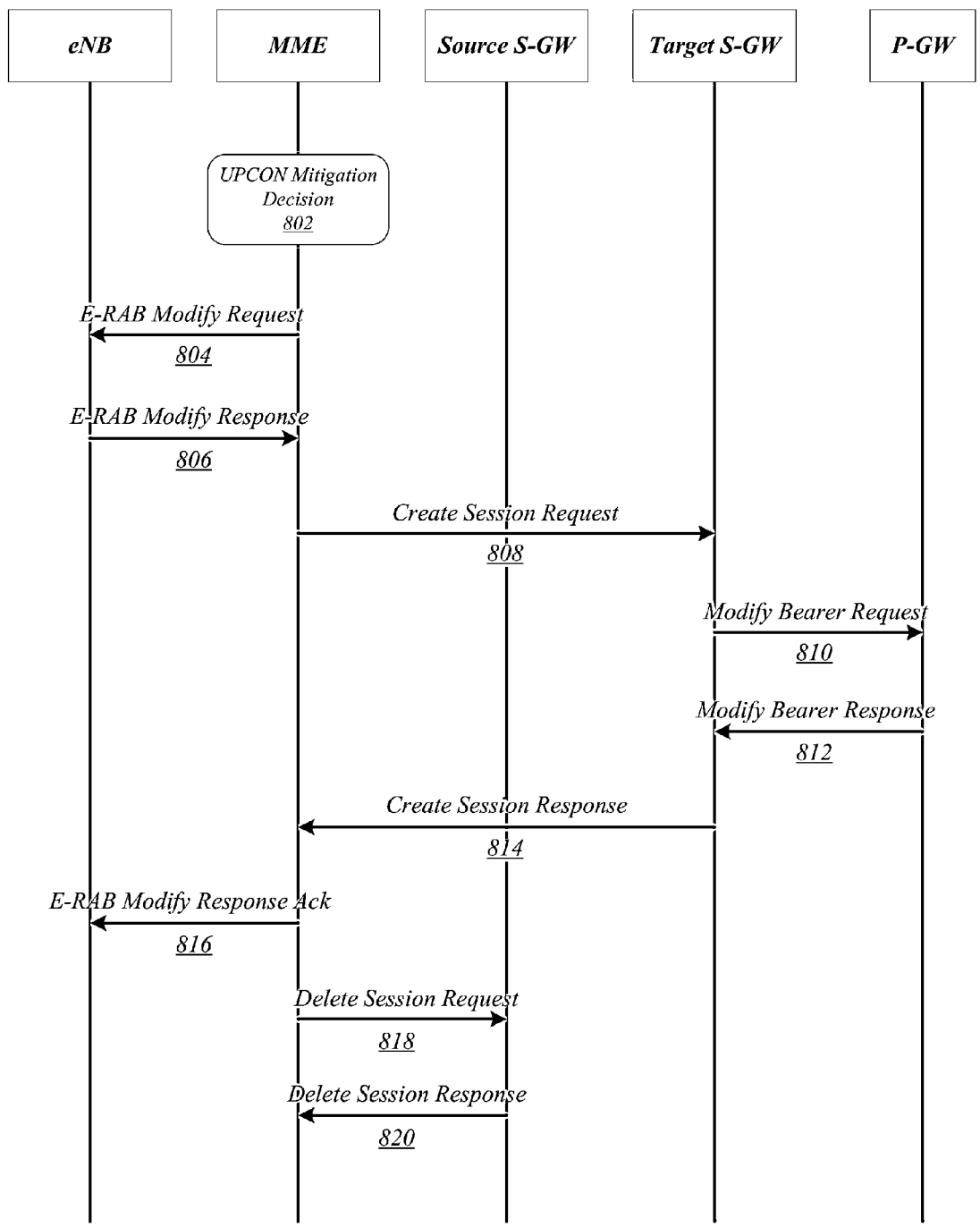
FIG. 8 illustrates one embodiment of a third communications flow.

FIG. 8 illustrates an embodiment of a communications flow 800 that comprises examples of communications that may be exchanged by various network devices and/or nodes in various embodiments. More particularly, like communications flow 700 of FIG. 7, communications flow 800 illustrates example communications that may be exchanged in some embodiments in which an MME of an E-UTRAN initiates UPCON mitigation. However, while the MME communicates with the target S-GW prior to communicating with the eNB in communications flow 700, the MME may communicate with the eNB prior to communicating with the target S-GW in communications flow 800.

At 802, the MME may elect to initiate UPCON mitigation. In various embodiments, the MME may elect to initiate UPCON mitigation because the uplink and/or downlink user plane traffic of an S1-U interface between the E-UTRAN and a source S-GW has neared, reached, or exceeded uplink and/or downlink capacities of the S1-U interface. In conjunction with electing to initiate UPCON mitigation, the MME may select, from among the UEs in a cell of an eNB, a set of UEs that are served by the source S-GW and that are to be reassigned to a target S-GW for service. In some embodiments, the MME may select the set of UEs only from among UEs in the cell that are in a connected mode.

At 804, the MME may send an E-RAB Modify Request to the eNB. In various embodiments, the E-RAB Modify Request may comprise one or more information elements indicating that S1-U interface UPCON mitigation is being performed for the source S-GW. In some embodiments, the E-RAB Modify Request may comprise one or more information elements indicating whether the S1-U interface UPCON mitigation is being performed with respect to the uplink direction, the downlink direction, or both. In various embodiments, the E-RAB Modify Request may comprise one or more additional information elements. In some embodiments, the one or more additional information elements may comprise, for example, an S1-MME address for the MME and/or an IMSI for each impacted UE. The embodiments are not limited in this context.

At 806, the eNB may reply to the E-RAB Modify Request by sending an E-RAB Modify Response to the MME. In various embodiments, the E-RAB Modify Response may comprise one or more information elements including, for example, an S1-MME address for the eNB; an IMSI for each impacted UE; an APN and/or linked EPS bearer ID for each affected PDN connection; and/or an EPS bearer ID and/or eNB S1-U address for each affected EPS bearer. The embodiments are not limited in this context.

Upon receiving the E-RAB Modify Response, the MME may select as the target S-GW an S-GW for which an S1-U interface to the eNB is uncongested. In some embodiments, the MME may perform this selection based on user plane traffic information for the target S-GW, such as user plane traffic information 210 of FIG. 2. Then, at 808, the MME may send a Create Session Request to the target S-GW. In various embodiments, the Create Session Request may comprise one or more information elements indicating that S1-U interface UPCON mitigation is being performed for the source S-GW. In some embodiments, the Create Session Request may comprise one or more information elements indicating whether the S1-U interface UPCON mitigation is being performed with respect to the uplink direction, the downlink direction, or both. In various embodiments, the Create Session Request may comprise one or more additional information elements. In some embodiments, the one or more additional information elements may comprise, for example, an S11 address for the MME; an IMSI for each impacted UE; an APN, linked EPS bearer ID, and/or P-GW S5/S8 control plane or PMIP address for each affected PDN connection; and/or an EPS bearer ID and/or eNB S1-U address for each affected EPS bearer. The embodiments are not limited in this context.

At 810, the target S-GW may modify the affected UEs' EPS bearer information based on the Create Session Request and then send a Modify Bearer Request to a P-GW that supports PDN connections of the affected UEs. It is to be understood that although example communications flow 800 illustrates a single P-GW, embodiments are both possible and contemplated in which Modify Bearer Requests are sent to multiple affected P-GWs, and the embodiments are not limited in this context. In various embodiments, the Modify Bearer Request may comprise one or more information elements indicating that S1-U interface UPCON mitigation is being performed for the source S-GW. In some embodiments, the Modify Bearer Request may comprise one or more information elements indicating whether the S1-U interface UPCON mitigation is being performed with respect to the uplink direction, the downlink direction, or both. In various embodiments, the Modify Bearer Request may comprise one or more additional information elements. In some embodiments, the one or more additional information elements may comprise, for example, a control plane address for the target S-GW; an IMSI for each impacted UE; an APN and/or linked EPS bearer ID for each affected PDN connection; and/or an EPS bearer ID and/or target S-GW S5/S8 user plane address for each affected EPS bearer. The embodiments are not limited in this context.

At 812, in response to receiving the Modify Bearer Request, a P-GW may modify the associated EPS bearer information for each PDN connection of the impacted UEs of the Modify Bearer Request and send a Modify Bearer Response to the target S-GW. As noted above, although communications flow 800 illustrates a single P-GW, there may be multiple affected P-GWs in various embodiments, and thus the target S-GW may receive multiple Modify Bearer Responses at 812. In some embodiments, the Modify Bearer Response may comprise one or more information elements including, for example, an S5/S8 control plane address for the P-GW; an IMSI for each impacted UE; an APN and/or linked EPS bearer ID for each affected PDN connection; and/or an EPS bearer ID and/or P-GW S5/S8 user plane address for each affected EPS bearer. The embodiments are not limited in this context.

At 814, the target S-GW may send a Create Session Response to the MME. In various embodiments, the Create Session Response may comprise one or more information elements including, for example, an S11 address for the target S-GW; an IMSI for each impacted UE; an APN and/or linked EPS bearer ID for each affected PDN connection; and/or an EPS bearer ID and/or target S-GW S1-U user plane address for each affected EPS bearer. The embodiments are not limited in this context.

At 816, the MME may send an E-RAB Modify Response Acknowledgment to the eNB. In some embodiments, the E-RAB Modify Response Acknowledgment may comprise one or more information elements including, for example, an S1-MME address for the MME; an IMSI for each impacted UE; an APN and/or linked EPS bearer ID for each affected PDN connection; and/or an EPS bearer ID and/or target S-GW S1-U user plane address for each affected EPS bearer. In various embodiments, the eNB may modify the affected UEs' EPS bearer information upon receipt of the E-RAB Modify Response Acknowledgment. The embodiments are not limited in this context.

At 818, the MME may send a Modify Bearer Request or Delete Session Request to the source S-GW, in order to remove the affected UEs' EPS bearer information. In some embodiments, the Modify Bearer Request or Delete Session Request may comprise one or more information elements indicating whether the affected UEs' S1-U traffic has been removed in the uplink direction, the downlink direction, or both. In various embodiments, the Modify Bearer Request or Delete Session Request may comprise one or more additional information elements indicating, for example, an IMSI for each impacted UE; and/or an APN and/or linked EPS bearer ID for each affected PDN connection. At 820, in response to the Modify Bearer Request or Delete Session Request, the source S-GW may send a Modify Bearer Response or Delete Session Response to the MME. In some embodiments, the MME and the S-GW may be operative to exchange a Modify Bearer Request at 818 and a Modify Bearer Response at 820 if the UPCON mitigation is performed with respect to only the uplink direction or only the downlink direction. The embodiments are not limited in this context.

Figure 9:
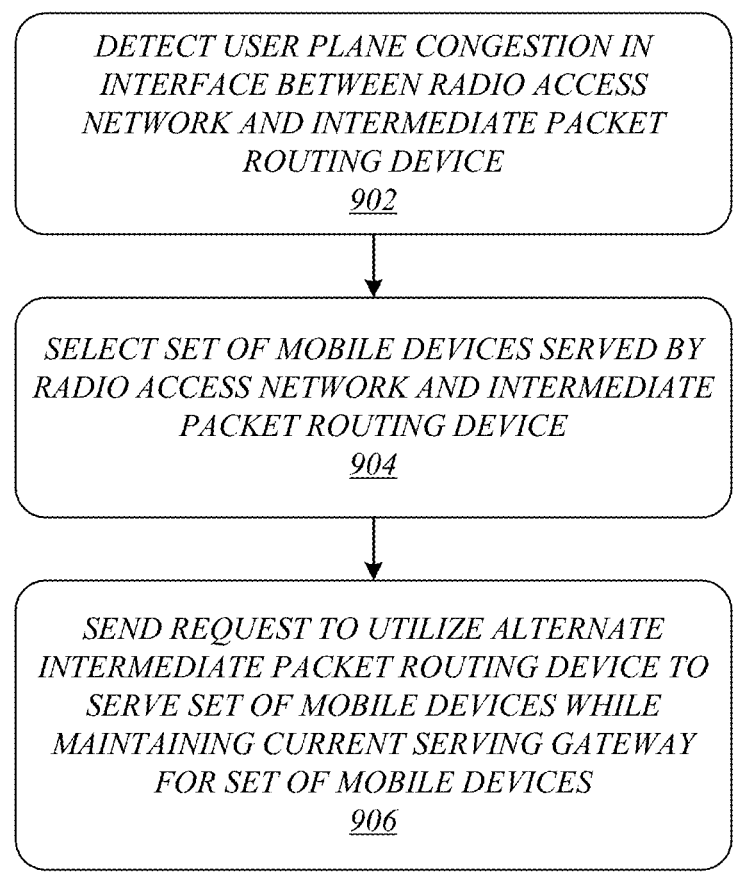
FIG. 9 illustrates one embodiment of a third logic flow.

FIG. 9 illustrates one embodiment of a logic flow 900, which may be representative of the operations executed by one or more embodiments described herein. More particularly, logic flow 900 may comprise an example of operations that may be performed by apparatus 200 and/or system 240 of FIG. 2 in conjunction with an UPCON mitigation process that comprises selecting an alternate intermediate packet routing device while maintaining a current serving gateway. As shown in logic flow 900, user plane congestion may be detected in an interface between a radio access network and an intermediate packet routing device at 902. For example, detection component 206 of FIG. 2 may detect user plane congestion within a portion of radio-to-packet interface 218 that connects a radio access network to an intermediate packet routing device, based on user plane traffic information 210 and interface capacity information 212. In various embodiments, the detected user plane congestion may comprise uplink congestion, downlink congestion, or both.

At 904, a set of mobile devices served by the radio access network and the intermediate packet routing device may be selected. For example, configuration component 208 of FIG. 2 may select a set of mobile devices served by the radio access network and the intermediate packet routing device that are connected by the portion of radio-to-packet interface 218. In some embodiments, the mobile devices may be selected from among those served by a particular base station of the radio access network. At 906, a request may be sent to utilize an alternate intermediate packet routing device to serve the set of mobile devices while maintaining a current serving gateway for the set of mobile devices. For example, configuration component 208 of FIG. 2 may send a configuration message 214 comprising a request that user plane data of its selected set of mobile devices be handled by an alternate intermediate packet routing device and a current serving gateway. In some embodiments, the request may comprise a request to utilize an alternate intermediate packet routing device to serve the set of mobile devices while maintaining both a current serving gateway and a current packet gateway for the set of mobile devices. The embodiments are not limited in this context.

FIG. 10A illustrates one embodiment 1000 of a third operating environment comprising an example of an environment in which logic flow 900 of FIG. 9 may be performed. In the operating environment of FIG. 10A, a UTRAN interfaces with an evolved packet core. As shown in FIG. 10A, a cell 1001 is served by a node B 1002, and contains user equipment (UEs) 1004, 1006, and 1008. Node B 1002 communicates with an RNC 1010 over an Iu-B interface connection 1012. RNC 1010 exchanges user plane data of UEs 1004, 1006, and 1008 with a current SGSN 1014 over an Iu-PS interface connection 1016. In turn, current SGSN 1014 exchanges user plane data of UEs 1004, 1006, and 1008 with a current S-GW 1018. Current S-GW 1018 communicates with a P-GW 1020, which communicates with a packet data network such as the internet. Additional RNCs 1022 also exchange user plane data with current SGSN 1014, over additional Iu-PS interface connections 1024. If the collective uplink and/or downlink user plane data rates of Iu-PS interface connections 1016 and 1022 approach, reach, and/or exceed uplink and/or downlink Iu-PS interface capacities for current SGSN 1014, uplink and/or downlink Iu-PS interface congestion may result. In order to reduce, eliminate, and/or prevent such congestion, uplink and/or downlink user plane traffic of one or more of UEs 1004, 1006, and 1008 may be allocated for handling by an alternate SGSN.

FIG. 10B illustrates another embodiment 1050 of the third operating environment. As shown in FIG. 10B, RNC 1010 may have the ability to exchange user plane data with an alternate SGSN 1026 over an Iu-PS interface connection 1028. In order to reduce, eliminate, and/or prevent uplink and/or downlink Iu-PS interface congestion at current SGSN 1014, uplink and/or downlink user plane traffic of one or more selected UEs of cell 1001 may be allocated for handling by alternate SGSN 1026 via Iu-PS interface connection 1028. In the example of FIG. 10B, the uplink and/or downlink user plane traffic of selected UEs 1006 and 1008 may be allocated for handling by alternate SGSN 1026 via Iu-PS interface connection 1028, while current SGSN 1014 continues to handle the uplink and/or downlink user plane traffic of UE 1004. Furthermore, current S-GW 1018 continues to handle the uplink and/or downlink user plane traffic of selected UEs 1006 and 1008, as well as that of UE 1004. The embodiments are not limited in this context.

Figure 11:
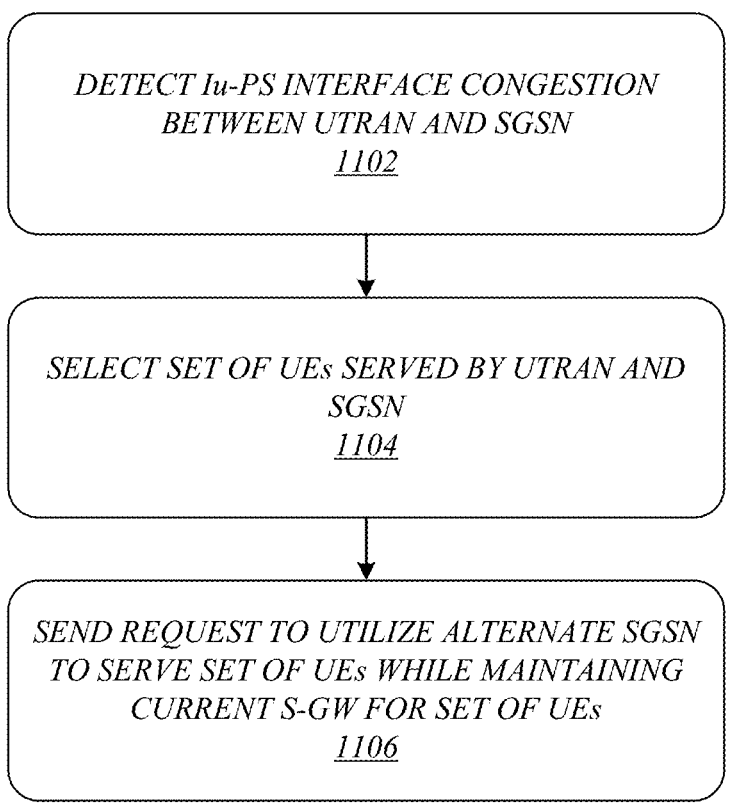
FIG. 11 illustrates one embodiment of a fourth logic flow.

FIG. 11 illustrates one embodiment of a logic flow 1100. Logic flow 1100 may comprise an example of operations that apparatus 200 and/or system 240 of FIG. 2 may perform in conjunction with UPCON mitigation in an operating environment such as that of FIG. 10B. As shown in FIG. 11, Iu-PS interface congestion between a UTRAN and an SGSN may be detected at 1102. For example, radio-to-packet interface 218 of FIG. 2 may connect a UTRAN with an SGSN via an Iu-PS interface, and detection component 206 of FIG. 2 may detect congestion in the Iu-PS interface based on user plane traffic information 210 and interface capacity information 212. At 1104, a set of UEs served by the UTRAN and the SGSN may be selected. For example, configuration component 208 of FIG. 2 may select a set of UEs served by the UTRAN and the SGSN that are connected by radio-to-packet interface 218. In various embodiments, the UEs may be selected from among those served by a particular node B of the UTRAN. At 1106, a request may be sent to utilize an alternate SGSN to serve the set of UEs while maintaining a current S-GW for the set of UEs. For example, configuration component 208 of FIG. 2 may send a configuration message 214 comprising a request that its selected set of UEs be served by an alternate SGSN that connects to the UTRAN via alternate radio-to-packet interface 220, while maintaining a current S-GW for the set of UEs. The embodiments are not limited to these examples.

FIG. 12 illustrates an embodiment of a communications flow 1200 that comprises examples of communications that may be exchanged by various network devices and/or nodes in some embodiments. More particularly, communications flow 1200 illustrates example communications that may be exchanged in various embodiments in which an RNC of a UTRAN initiates UPCON mitigation. At 1202, the RNC may elect to initiate UPCON mitigation. In some embodiments, the RNC may elect to initiate UPCON mitigation because the uplink and/or downlink user plane traffic of an Iu-PS interface between the UTRAN and a source SGSN has neared, reached, or exceeded uplink and/or downlink capacities of the Iu-PS interface. In conjunction with electing to initiate UPCON mitigation, the RNC may select, from among the UEs in a cell of a node B, a set of UEs that are served by the source SGSN and that are to be reassigned to a target SGSN for service. In various embodiments, the RNC may select the set of UEs only from among UEs in the cell that are in a connected mode. In some embodiments, the RNC may select as the target SGSN an SGSN for which an Iu-PS interface to the node B is uncongested. In various embodiments, the RNC may perform this selection based on user plane traffic information for the target SGSN, such as user plane traffic information 210 of FIG. 2.

At 1204, the RNC may send an Iu Switch Request to the target SGSN. In some embodiments, the Iu Switch Request may comprise one or more information elements indicating that Iu-PS interface UPCON mitigation is being performed for the source SGSN. In various embodiments, the Iu Switch Request may comprise one or more information elements indicating whether the Iu-PS interface UPCON mitigation is being performed with respect to the uplink direction, the downlink direction, or both. In some embodiments, the Iu Switch Request may comprise one or more additional information elements. In various embodiments, the one or more additional information elements may comprise, for example, an IMSI for each impacted UE; and/or an RAB ID, transport layer address, and/or Iu transport association for each affected RAB. The embodiments are not limited in this context.

At 1206, the target SGSN may send a Modify Bearer Request to an S-GW that supports PDN connections of the selected set of UEs. It is to be understood that although example communications flow 1200 illustrates a single S-GW, embodiments are both possible and contemplated in which Modify Bearer Requests are sent to multiple affected S-GWs, and the embodiments are not limited in this context. In some embodiments, the Modify Bearer Request may comprise one or more information elements indicating that Iu-PS interface UPCON mitigation is being performed for the source SGSN. In various embodiments, the Modify Bearer Request may comprise one or more information elements indicating whether the Iu-PS interface UPCON mitigation is being performed with respect to the uplink direction, the downlink direction, or both. In some embodiments, the Modify Bearer Request may comprise one or more additional information elements. In various embodiments, the one or more additional information elements may comprise, for example, a target SGSN S4 control plane address; an IMSI for each impacted UE; an APN and/or linked EPS bearer ID for each affected PDN connection; and/or an EPS bearer ID and/or target SGSN S4 user plane address for each affected EPS bearer. The embodiments are not limited in this context.

At 1208, in response to receiving the Modify Bearer Request, the S-GW may modify the associated EPS bearer information for each PDN connection of the impacted UEs of the Modify Bearer Request and send a Modify Bearer Response to the target SGSN. As noted above, although communications flow 1200 illustrates a single S-GW, there may be multiple affected S-GWs in some embodiments, and thus the target SGSN may receive multiple Modify Bearer Responses at 1208. In various embodiments, the Modify Bearer Response may comprise one or more information elements including, for example, an S4 control plane address for the S-GW; an IMSI for each impacted UE; an APN and/or linked EPS bearer ID for each affected PDN connection; and/or an EPS bearer ID and/or S-GW S4 user plane address for each affected EPS bearer. The embodiments are not limited in this context.

At 1210, the target SGSN may modify the associated RAB information for the affected RABs associated with the Modify Bearer Response and send an Iu Switch Request Acknowledgment to the RNC. In some embodiments, the Iu Switch Request Acknowledgment may comprise one or more information elements including, for example, an IMSI for each impacted UE; and/or an RAB ID, transport layer address, and/or Iu transport association for each affected RAB. The embodiments are not limited in this context.

At 1212, the RNC may modify the associated RAB information for the affected RABs associated with the Iu Switch Request Acknowledgment and may send an Iu Release Request or a RAB Release Request to the source SGSN. In various embodiments, the Iu Release Request or RAB Release Request may comprise one or more information elements indicating whether the affected UEs' Iu-PS traffic has been removed in the uplink direction, the downlink direction, or both. In some embodiments, the Iu Release Request or RAB Release Request may comprise one or more additional information elements indicating, for example, an IMSI for each impacted UE. At 1214, in response to the Iu Release Request or RAB Release Request, the source SGSN may remove the impacted RNC context for the impacted UEs and optionally send an Iu Release Request Acknowledgment or RAB Release Request Acknowledgment to the RNC. The embodiments are not limited in this context.

FIG. 13 illustrates an embodiment of a communications flow 1300 that comprises examples of communications that may be exchanged by various network devices and/or nodes in various embodiments. More particularly, communications flow 1300 illustrates example communications that may be exchanged in some embodiments in which an SGSN initiates UPCON mitigation for an Iu-PS interface connection with a UTRAN. In the example of FIG. 13, the SGSN that initiates the UPCON mitigation is labeled as the source SGSN.

At 1302, the source SGSN may elect to initiate UPCON mitigation. In various embodiments, the source SGSN may elect to initiate UPCON mitigation because the uplink and/or downlink user plane traffic of an Iu-PS interface between the UTRAN and the source SGSN has neared, reached, or exceeded uplink and/or downlink capacities of the Iu-PS interface. In conjunction with electing to initiate UPCON mitigation, the source SGSN may select, from among the UEs in a cell of a node B served by an RNC, a set of UEs that are served by the source SGSN and that are to be reassigned to a target SGSN for service. In some embodiments, the source SGSN may select the set of UEs only from among UEs in the cell that are in a connected mode. In various embodiments, the source SGSN may select as the target SGSN an SGSN for which an Iu-PS interface to the node B is uncongested. In some embodiments, the source SGSN may perform this selection based on user plane traffic information for the target SGSN, such as user plane traffic information 210 of FIG. 2.

At 1304, the source SGSN may send an Iu Switch Trigger to the RNC. In various embodiments, the Iu Switch Trigger may comprise one or more information elements indicating that Iu-PS interface UPCON mitigation is being performed for the source SGSN. In some embodiments, the Iu Switch Trigger may comprise one or more information elements indicating whether the Iu-PS interface UPCON mitigation is being performed with respect to the uplink direction, the downlink direction, or both. In various embodiments, the Iu Switch Trigger may comprise one or more information elements indicating a control plane address for the target SGSN. In some embodiments, the Iu Switch Trigger may comprise one or more additional information elements. In various embodiments, the one or more additional information elements may comprise, for example, an IMSI for each impacted UE. The embodiments are not limited in this context.

At 1306, the RNC may send an Iu Switch Request to the target SGSN. In some embodiments, the Iu Switch Request may comprise one or more information elements indicating that Iu-PS interface UPCON mitigation is being performed for the source SGSN. In various embodiments, the Iu Switch Request may comprise one or more information elements indicating whether the Iu-PS interface UPCON mitigation is being performed with respect to the uplink direction, the downlink direction, or both. In some embodiments, the Iu Switch Request may comprise one or more additional information elements. In various embodiments, the one or more additional information elements may comprise, for example, an IMSI for each impacted UE; and/or an RAB ID, transport layer address, and/or Iu transport association for each affected RAB. The embodiments are not limited in this context.

At 1308, the target SGSN may send a Modify Bearer Request to an S-GW that supports PDN connections of the selected set of UEs. It is to be understood that although example communications flow 1300 illustrates a single S-GW, embodiments are both possible and contemplated in which Modify Bearer Requests are sent to multiple affected S-GWs, and the embodiments are not limited in this context. In some embodiments, the Modify Bearer Request may comprise one or more information elements indicating that Iu-PS interface UPCON mitigation is being performed for the source SGSN. In various embodiments, the Modify Bearer Request may comprise one or more information elements indicating whether the Iu-PS interface UPCON mitigation is being performed with respect to the uplink direction, the downlink direction, or both. In some embodiments, the Modify Bearer Request may comprise one or more additional information elements. In various embodiments, the one or more additional information elements may comprise, for example, a target SGSN S4 control plane address; an IMSI for each impacted UE; an APN and/or linked EPS bearer ID for each affected PDN connection; and/or an EPS bearer ID and/or target SGSN S4 user plane address for each affected EPS bearer. The embodiments are not limited in this context.

At 1310, in response to receiving the Modify Bearer Request, the S-GW may modify the associated EPS bearer information for each PDN connection of the impacted UEs of the Modify Bearer Request and send a Modify Bearer Response to the target SGSN. As noted above, although communications flow 1300 illustrates a single S-GW, there may be multiple affected S-GWs in some embodiments, and thus the target SGSN may receive multiple Modify Bearer Responses at 1310. In various embodiments, the Modify Bearer Response may comprise one or more information elements including, for example, an S4 control plane address for the S-GW; an IMSI for each impacted UE; an APN and/or linked EPS bearer ID for each affected PDN connection; and/or an EPS bearer ID and/or S-GW S4 user plane address for each affected EPS bearer. The embodiments are not limited in this context.

At 1312, the target SGSN may modify the associated RAB information for the affected RABs associated with the Modify Bearer Response and send an Iu Switch Request Acknowledgment to the RNC. In some embodiments, the Iu Switch Request Acknowledgment may comprise one or more information elements including, for example, an IMSI for each impacted UE; and/or an RAB ID, transport layer address, and/or Iu transport association for each affected RAB. The embodiments are not limited in this context.

At 1314, the RNC may modify the associated RAB information for the affected RABs associated with the Iu Switch Request Acknowledgment and may send an Iu Release Request or a RAB Release Request to the source SGSN. In various embodiments, the Iu Release Request or RAB Release Request may comprise one or more information elements indicating whether the affected UEs' Iu-PS traffic has been removed in the uplink direction, the downlink direction, or both. In some embodiments, the Iu Release Request or RAB Release Request may comprise one or more additional information elements indicating, for example, an IMSI for each impacted UE. At 1316, in response to the Iu Release Request or RAB Release Request, the source SGSN may remove the impacted RNC context for the impacted UEs and optionally send an Iu Release Request Acknowledgment or RAB Release Request Acknowledgment to the RNC. The embodiments are not limited in this context.

FIG. 14A illustrates one embodiment 1400 of a fourth operating environment comprising another example of an environment in which logic flow 900 of FIG. 9 may be performed. In the operating environment of FIG. 14A, a GERAN interfaces with an evolved packet core. As shown in FIG. 14A, a cell 1401 is served by a BTS 1402, and contains mobile stations (MSs) 1404, 1406, and 1408. BTS 1402 communicates with an RNC 1410 over an Abis interface connection 1412. RNC 1410 exchanges user plane data of MSs 1404, 1406, and 1408 with a current SGSN 1414 over a Gb interface connection 1416. In turn, current SGSN 1414 exchanges user plane data of MSs 1404, 1406, and 1408 with a current S-GW 1418. Current S-GW 1418 communicates with a P-GW 1420, which communicates with a packet data network such as the internet. Additional RNCs 1422 also exchange user plane data with current SGSN 1414, over additional Gb interface connections 1424. If the collective uplink and/or downlink user plane data rates of Gb interface connections 1416 and 1422 approach, reach, and/or exceed uplink and/or downlink Gb interface capacities for current SGSN 1414, uplink and/or downlink Gb interface congestion may result. In order to reduce, eliminate, and/or prevent such congestion, uplink and/or downlink user plane traffic of one or more of MSs 1404, 1406, and 1408 may be allocated for handling by an alternate SGSN.

FIG. 14B illustrates another embodiment 1450 of the fourth operating environment. As shown in FIG. 14B, RNC 1410 may have the ability to exchange user plane data with an alternate SGSN 1426 over a Gb interface connection 1428. In order to reduce, eliminate, and/or prevent uplink and/or downlink Gb interface congestion at current SGSN 1414, uplink and/or downlink user plane traffic of one or more selected MSs of cell 1401 may be allocated for handling by alternate SGSN 1426 via Gb interface connection 1428. In the example of FIG. 14B, the uplink and/or downlink user plane traffic of selected MSs 1406 and 1408 may be allocated for handling by alternate SGSN 1426 via Gb interface connection 1428, while current SGSN 1414 may continue to handle the uplink and/or downlink user plane traffic of MS 1404. Furthermore, current S-GW 1418 continues to handle the uplink and/or downlink user plane traffic of selected MSs 1406 and 1408, as well as that of MS 1404. The embodiments are not limited in this context.

Figure 15:
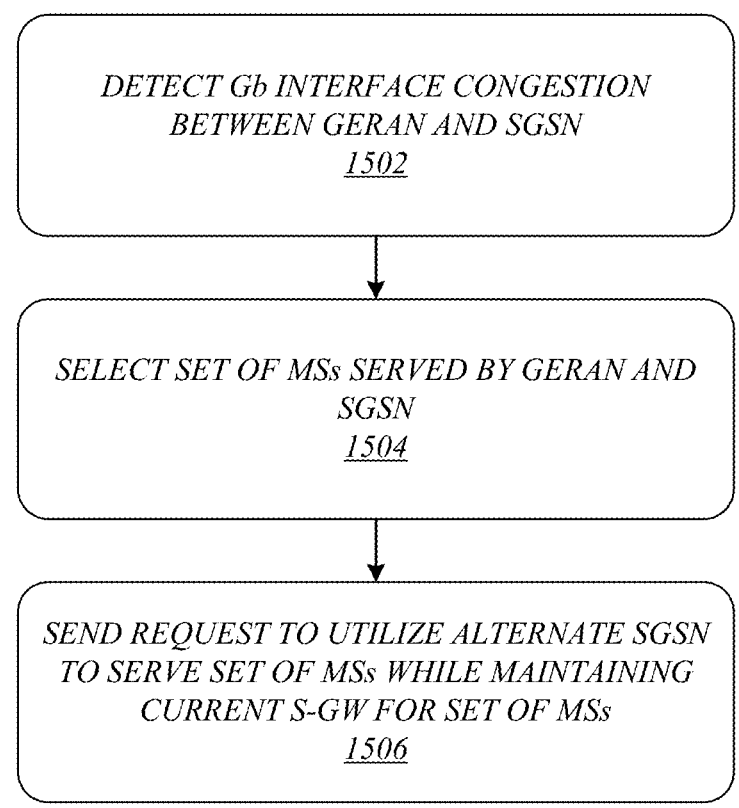
FIG. 15 illustrates one embodiment of a fifth logic flow.

FIG. 15 illustrates one embodiment of a logic flow 1500. Logic flow 1500 may comprise an example of operations that apparatus 200 and/or system 240 of FIG. 2 may perform in conjunction with UPCON mitigation in an operating environment such as that of FIG. 14B. As shown in FIG. 15, Gb interface congestion between a GERAN and an SGSN may be detected at 1502. For example, radio-to-packet interface 218 of FIG. 2 may connect a GERAN with an SGSN via an Gb interface, and detection component 206 of FIG. 2 may detect congestion in the Gb interface based on user plane traffic information 210 and interface capacity information 212. At 1504, a set of MSs served by the UTRAN and the SGSN may be selected. For example, configuration component 208 of FIG. 2 may select a set of MSs served by the GERAN and the SGSN that are connected by radio-to-packet interface 218. In various embodiments, the MSs may be selected from among those served by a particular BTS of the GERAN. At 1506, a request may be sent to utilize an alternate SGSN to serve the set of MSs while maintaining a current S-GW for the set of MSs. For example, configuration component 208 of FIG. 2 may send a configuration message 214 comprising a request that its selected set of MSs be served by an alternate SGSN that connects to the GERAN via alternate radio-to-packet interface 220, while maintaining a current S-GW for the set of MSs. The embodiments are not limited to these examples.

Figure 16:
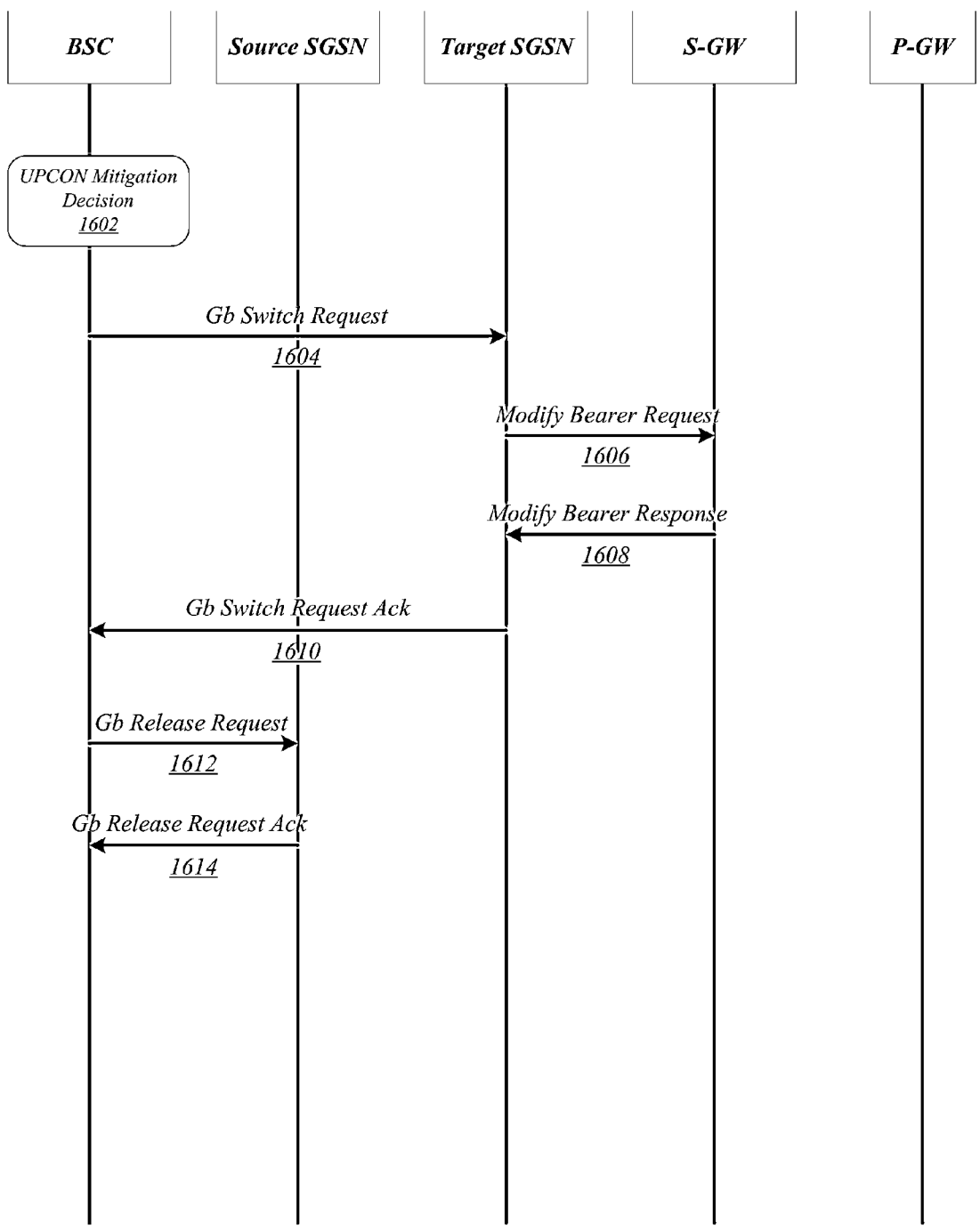
FIG. 16 illustrates one embodiment of a sixth communications flow.

FIG. 16 illustrates an embodiment of a communications flow 1600 that comprises examples of communications that may be exchanged by various network devices and/or nodes in some embodiments. More particularly, communications flow 1600 illustrates example communications that may be exchanged in various embodiments in which a BSC of a GERAN initiates UPCON mitigation. At 1602, the BSC may elect to initiate UPCON mitigation. In some embodiments, the BSC may elect to initiate UPCON mitigation because the uplink and/or downlink user plane traffic of a Gb interface between the GERAN and a source SGSN has neared, reached, or exceeded uplink and/or downlink capacities of the Gb interface. In conjunction with electing to initiate UPCON mitigation, the BSC may select, from among the MSs in a cell of a BTS, a set of MSs that are served by the source SGSN and that are to be reassigned to a target SGSN for service. In various embodiments, the BSC may select the set of MSs only from among MSs in the cell that are in a connected mode. In some embodiments, the BSC may select as the target SGSN an SGSN for which a Gb interface to the BTS is uncongested. In various embodiments, the BSC may perform this selection based on user plane traffic information for the target SGSN, such as user plane traffic information 210 of FIG. 2.

At 1604, the BSC may send a Gb Switch Request to the target SGSN. In some embodiments, the Gb Switch Request may comprise one or more information elements indicating that Gb interface UPCON mitigation is being performed for the source SGSN. In various embodiments, the Gb Switch Request may comprise one or more information elements indicating whether the Gb interface UPCON mitigation is being performed with respect to the uplink direction, the downlink direction, or both. In some embodiments, the Gb Switch Request may comprise one or more additional information elements. In various embodiments, the one or more additional information elements may comprise, for example, an IMSI for each impacted MS. The embodiments are not limited in this context.

At 1606, the target SGSN may send a Modify Bearer Request to an S-GW that supports PDN connections of the selected set of MSs. It is to be understood that although example communications flow 1600 illustrates a single S-GW, embodiments are both possible and contemplated in which Modify Bearer Requests are sent to multiple affected S-GWs, and the embodiments are not limited in this context. In some embodiments, the Modify Bearer Request may comprise one or more information elements indicating that Gb interface UPCON mitigation is being performed for the source SGSN. In various embodiments, the Modify Bearer Request may comprise one or more information elements indicating whether the Gb interface UPCON mitigation is being performed with respect to the uplink direction, the downlink direction, or both. In some embodiments, the Modify Bearer Request may comprise one or more additional information elements. In various embodiments, the one or more additional information elements may comprise, for example, a target SGSN S4 control plane address; an IMSI for each impacted MS; an APN and/or linked EPS bearer ID for each affected PDN connection; and/or an EPS bearer ID and/or target SGSN S4 user plane address for each affected EPS bearer. The embodiments are not limited in this context.

At 1608, in response to receiving the Modify Bearer Request, the S-GW may modify the associated EPS bearer information for each PDN connection of the impacted MSs of the Modify Bearer Request and send a Modify Bearer Response to the target SGSN. As noted above, although communications flow 1600 illustrates a single S-GW, there may be multiple affected S-GWs in some embodiments, and thus the target SGSN may receive multiple Modify Bearer Responses at 1608. In various embodiments, the Modify Bearer Response may comprise one or more information elements including, for example, an S4 control plane address for the S-GW; an IMSI for each impacted MS; an APN and/or linked EPS bearer ID for each affected PDN connection; and/or an EPS bearer ID and/or S-GW S4 user plane address for each affected EPS bearer. The embodiments are not limited in this context.

At 1610, the target SGSN may modify the affected BSS context information associated with the Modify Bearer Response and send a Gb Switch Request Acknowledgment to the BSC. In some embodiments, the Gb Switch Request Acknowledgment may comprise one or more information elements including, for example, an IMSI for each impacted MS. The embodiments are not limited in this context.

At 1612, the BSC may modify the affected BSS context information associated with the Gb Switch Request Acknowledgment and may send a Gb Release Request or a RAB Release Request to the source SGSN. In various embodiments, the Gb Release Request or RAB Release Request may comprise one or more information elements indicating whether the affected MSs' Gb traffic has been removed in the uplink direction, the downlink direction, or both. In some embodiments, the Gb Release Request or RAB Release Request may comprise one or more additional information elements indicating, for example, an IMSI for each impacted MS. At 1614, in response to the Gb Release Request or RAB Release Request, the source SGSN may remove the impacted BSS context for the impacted MSs and optionally send a Gb Release Request Acknowledgment or RAB Release Request Acknowledgment to the BSC. The embodiments are not limited in this context.

Figure 17:
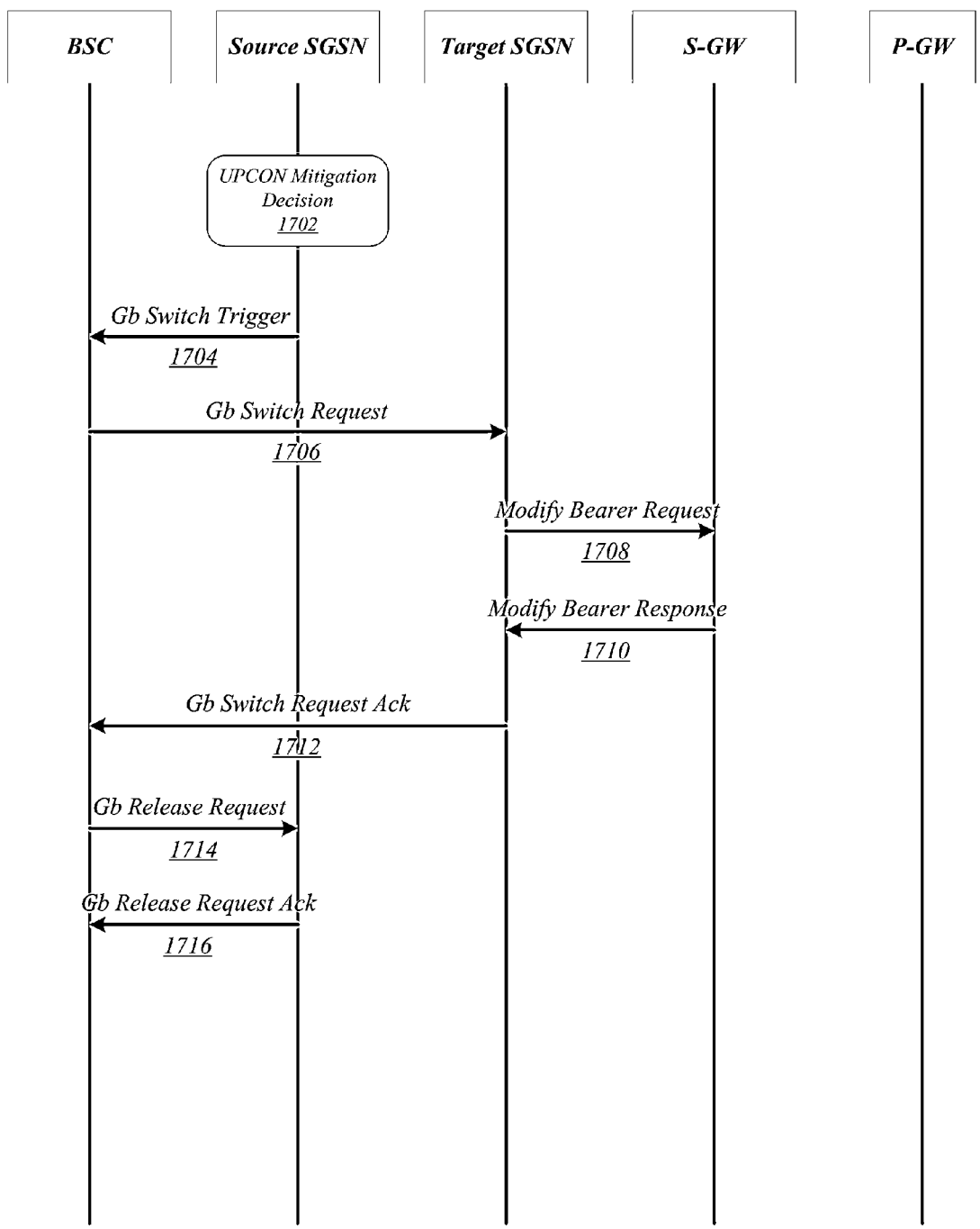
FIG. 17 illustrates one embodiment of a seventh communications flow.

FIG. 17 illustrates an embodiment of a communications flow 1700 that comprises examples of communications that may be exchanged by various network devices and/or nodes in various embodiments. More particularly, communications flow 1700 illustrates example communications that may be exchanged in some embodiments in which an SGSN initiates UPCON mitigation for a Gb interface connection with a GERAN. In the example of FIG. 17, the SGSN that initiates the UPCON mitigation is labeled as the source SGSN.

At 1702, the source SGSN may elect to initiate UPCON mitigation. In various embodiments, the source SGSN may elect to initiate UPCON mitigation because the uplink and/or downlink user plane traffic of a Gb interface between the GERAN and the source SGSN has neared, reached, or exceeded uplink and/or downlink capacities of the Gb interface. In conjunction with electing to initiate UPCON mitigation, the source SGSN may select, from among the MSs in a cell of a BTS served by a BSC, a set of MSs that are served by the source SGSN and that are to be reassigned to a target SGSN for service. In some embodiments, the source SGSN may select the set of MSs only from among MSs in the cell that are in a connected mode. In various embodiments, the source SGSN may select as the target SGSN an SGSN for which a Gb interface to the BTS is uncongested. In some embodiments, the source SGSN may perform this selection based on user plane traffic information for the target SGSN, such as user plane traffic information 210 of FIG. 2.

At 1704, the source SGSN may send a Gb Switch Trigger to the BSC. In various embodiments, the Gb Switch Trigger may comprise one or more information elements indicating that Gb interface UPCON mitigation is being performed for the source SGSN. In some embodiments, the Gb Switch Trigger may comprise one or more information elements indicating whether the Gb interface UPCON mitigation is being performed with respect to the uplink direction, the downlink direction, or both. In various embodiments, the Gb Switch Trigger may comprise one or more information elements indicating a control plane address for the target SGSN. In some embodiments, the Gb Switch Trigger may comprise one or more additional information elements. In various embodiments, the one or more additional information elements may comprise, for example, an IMSI for each impacted MS. The embodiments are not limited in this context.

At 1706, the BSC may send a Gb Switch Request to the target SGSN. In some embodiments, the Gb Switch Request may comprise one or more information elements indicating that Gb interface UPCON mitigation is being performed for the source SGSN. In various embodiments, the Gb Switch Request may comprise one or more information elements indicating whether the Gb interface UPCON mitigation is being performed with respect to the uplink direction, the downlink direction, or both. In some embodiments, the Gb Switch Request may comprise one or more additional information elements. In various embodiments, the one or more additional information elements may comprise, for example, an IMSI for each impacted MS. The embodiments are not limited in this context.

At 1708, the target SGSN may send a Modify Bearer Request to an S-GW that supports PDN connections of the selected set of MSs. It is to be understood that although example communications flow 1700 illustrates a single S-GW, embodiments are both possible and contemplated in which Modify Bearer Requests are sent to multiple affected S-GWs, and the embodiments are not limited in this context. In some embodiments, the Modify Bearer Request may comprise one or more information elements indicating that Gb interface UPCON mitigation is being performed for the source SGSN. In various embodiments, the Modify Bearer Request may comprise one or more information elements indicating whether the Gb interface UPCON mitigation is being performed with respect to the uplink direction, the downlink direction, or both. In some embodiments, the Modify Bearer Request may comprise one or more additional information elements. In various embodiments, the one or more additional information elements may comprise, for example, a target SGSN S4 control plane address; an IMSI for each impacted MS; an APN and/or linked EPS bearer ID for each affected PDN connection; and/or an EPS bearer ID and/or target SGSN S4 user plane address for each affected EPS bearer. The embodiments are not limited in this context.

At 1710, in response to receiving the Modify Bearer Request, the S-GW may modify the associated EPS bearer information for each PDN connection of the impacted MSs of the Modify Bearer Request and send a Modify Bearer Response to the target SGSN. As noted above, although communications flow 1700 illustrates a single S-GW, there may be multiple affected S-GWs in some embodiments, and thus the target SGSN may receive multiple Modify Bearer Responses at 1710. In various embodiments, the Modify Bearer Response may comprise one or more information elements including, for example, an S4 control plane address for the S-GW; an IMSI for each impacted MS; an APN and/or linked EPS bearer ID for each affected PDN connection; and/or an EPS bearer ID and/or S-GW S4 user plane address for each affected EPS bearer. The embodiments are not limited in this context.

At 1712, the target SGSN may modify the affected BSS context information associated with the Modify Bearer Response and send a Gb Switch Request Acknowledgment to the BSC. In some embodiments, the Gb Switch Request Acknowledgment may comprise one or more information elements including, for example, an IMSI for each impacted MS. The embodiments are not limited in this context.

At 1714, the BSC may modify the affected BSS context information associated with the Gb Switch Request Acknowledgment and may send a Gb Release Request or a RAB Release Request to the source SGSN. In various embodiments, the Gb Release Request or RAB Release Request may comprise one or more information elements indicating whether the affected MSs' Gb traffic has been removed in the uplink direction, the downlink direction, or both. In some embodiments, the Gb Release Request or RAB Release Request may comprise one or more additional information elements indicating, for example, an IMSI for each impacted MS. At 1716, in response to the Gb Release Request or RAB Release Request, the source SGSN may remove the impacted BSS context for the impacted MSs and optionally send a Gb Release Request Acknowledgment or RAB Release Request Acknowledgment to the BSC. The embodiments are not limited in this context.

FIG. 18 illustrates an embodiment of a storage medium 1800. The storage medium 1800 may comprise an article of manufacture. In one embodiment, the storage medium 1800 may comprise any non-transitory computer readable medium or machine readable medium, such as an optical, magnetic or semiconductor storage. The storage medium may store various types of computer executable instructions, such as instructions to implement one or more of logic flows 300, 500, 900, 1100, and/or 1500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 19:
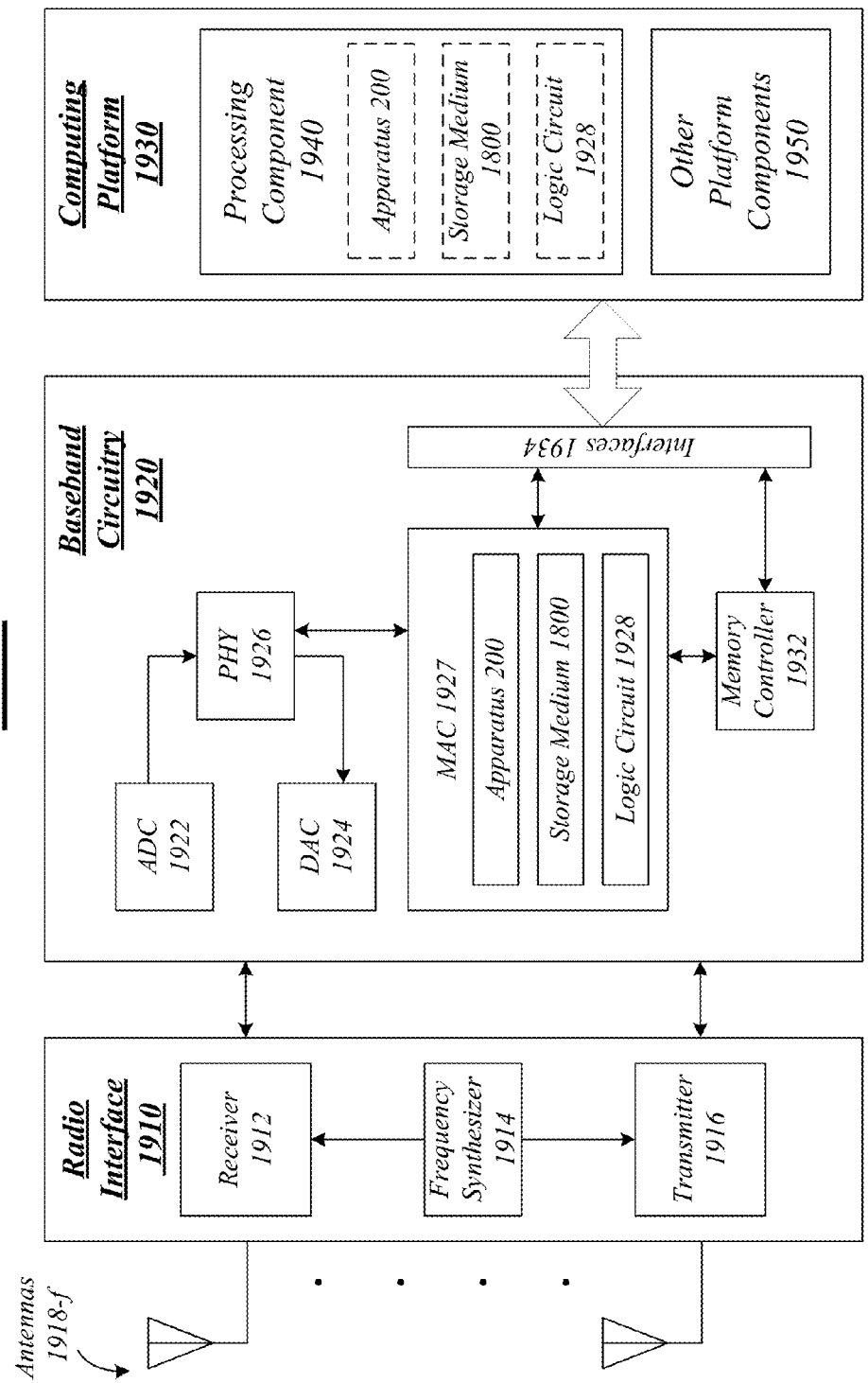
FIG. 19 illustrates one embodiment of a computing architecture.

FIG. 19 illustrates an embodiment of a device 1900 for use in a broadband wireless access network. Device 1900 may implement, for example, apparatus 200, system 240, storage medium 1800 and/or a logic circuit 1928. The logic circuit 1928 may include physical circuits to perform operations described for apparatus 200, for example. As shown in FIG. 19, device 1900 may include a radio interface 1910, baseband circuitry 1920, and computing platform 1930, although the embodiments are not limited to this configuration.

The device 1900 may implement some or all of the structure and/or operations for the apparatus 200, system 240, storage medium 1800, and/or logic circuit 1928 in a single computing entity, such as entirely within a single device. Alternatively, the device 1900 may distribute portions of the structure and/or operations for the apparatus 200, system 240, storage medium 1800, and/or logic circuit 1928 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1910 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1910 may include, for example, a receiver 1912, a frequency synthesizer 1914, and/or a transmitter 1916. Radio interface 1910 may include bias controls, a crystal oscillator and/or one or more antennas 1918-f. In another embodiment, radio interface 1910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1920 may communicate with radio interface 1910 to process receive and/or transmit signals and may include, for example, an analog-to-digital converter 1922 for down converting received signals, a digital-to-analog converter 1924 for up converting signals for transmission. Further, baseband circuitry 1920 may include a baseband or physical layer (PHY) processing circuit 1926 for PHY link layer processing of respective receive/transmit signals. Baseband circuitry 1920 may include, for example, a medium access control (MAC) processing circuit 1927 for MAC/data link layer processing. Baseband circuitry 1920 may include a memory controller 1932 for communicating with MAC processing circuit 1927 and/or a computing platform 1930, for example, via one or more interfaces 1934.

In some embodiments, PHY processing circuit 1926 may include a frame construction and/or detection module, in combination with additional circuitry such as a buffer memory, to construct and/or deconstruct communication frames and/or packets. Alternatively or in addition, MAC processing circuit 1927 may share processing for certain of these functions or perform these processes independent of PHY processing circuit 1926. In some embodiments, MAC and PHY processing may be integrated into a single circuit.

The computing platform 1930 may provide computing functionality for the device 1900. As shown, the computing platform 1930 may include a processing component 1940. In addition to, or alternatively of, the baseband circuitry 1920, the device 1900 may execute processing operations or logic for the apparatus 200, system 240, storage medium 1800, and/or logic circuit 1928 using the processing component 1940. The processing component 1940 (and/or PHY 1926 and/or MAC 1927) may comprise various hardware elements, software elements, or a combination of both. Examples of hardware elements may include devices, logic devices, components, processors, microprocessors, circuits, processor circuits (e.g., processor circuit 120), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1930 may further include other platform components 1950. Other platform components 1950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1900 described herein, may be included or omitted in various embodiments of device 1900, as suitably desired. In some embodiments, device 1900 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 1900 may be implemented using single input single output (SISO) architectures. However, certain implementations may include multiple antennas (e.g., antennas 1918-f) for transmission and/or reception using adaptive antenna techniques for beamforming or spatial division multiple access (SDMA) and/or using MIMO communication techniques.

The components and features of device 1900 may be implemented using any combination of discrete circuitry, application specific integrated circuits (ASICs), logic gates and/or single chip architectures. Further, the features of device 1900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1900 shown in the block diagram of FIG. 19 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 20:
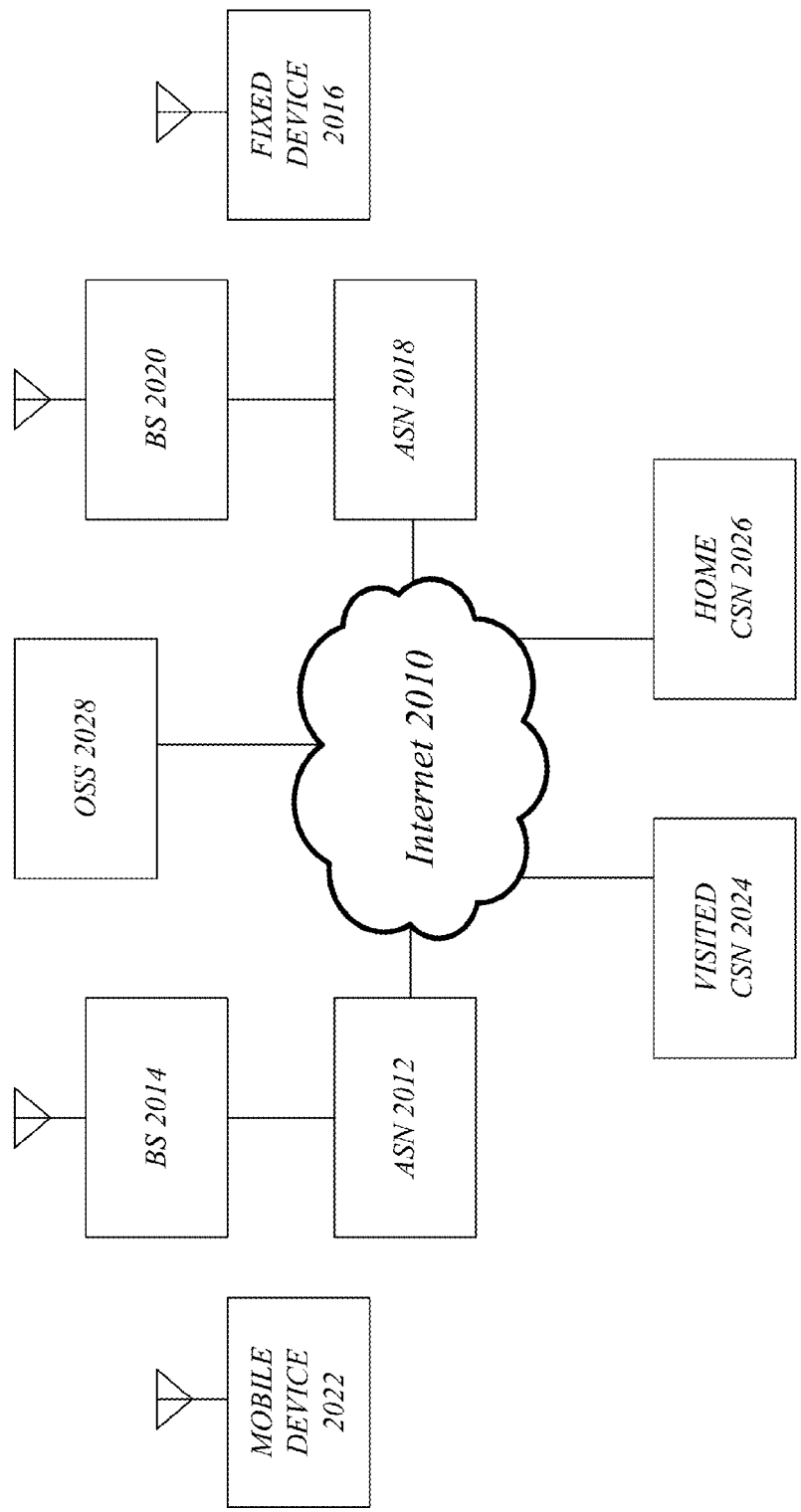
FIG. 20 illustrates one embodiment of a communications system.

FIG. 20 illustrates an embodiment of a broadband wireless access system 2000. As shown in FIG. 20, broadband wireless access system 2000 may be an internet protocol (IP) type network comprising an internet 2010 type network or the like that is capable of supporting mobile wireless access and/or fixed wireless access to internet 2010. In one or more embodiments, broadband wireless access system 2000 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 2000, access service networks (ASN) 2012, 2018 are capable of coupling with base stations (BS) (or eNodeBs) 2014, 2020, respectively, to provide wireless communication between one or more fixed devices 2016 and internet 2010 and/or between or one or more mobile devices 2022 and Internet 2010. One example of a fixed device 2016 and a mobile device 2022 is device 1900, with the fixed device 2016 comprising a stationary version of device 1900 and the mobile device 2022 comprising a mobile version of device 1900. ASNs 2012, 2018 may implement profiles that are capable of defining the mapping of network functions to one or more physical entities on broadband wireless access system 2000. Base stations (or eNodeBs) 2014, 2020 may comprise radio equipment to provide RF communication with fixed device 2016 and/or mobile device 2022, such as described with reference to device 1900, and may comprise, for example, the PHY and MAC layer equipment in compliance with a 3GPP LTE Specification or an IEEE 802.16 Standard. Base stations (or eNodeBs) 2014, 2020 may further comprise an IP backplane to couple to Internet 2010 via ASNs 2012, 2018, respectively, although the scope of the claimed subject matter is not limited in these respects.

Broadband wireless access system 2000 may further comprise a visited connectivity service network (CSN) 2024 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 2024 or home CSN 2026, and the scope of the claimed subject matter is not limited in these respects. Visited CSN 2024 may be referred to as a visited CSN in the case where visited CSN 2024 is not part of the regular service provider of fixed device 2016 or mobile device 2022, for example where fixed device 2016 or mobile device 2022 is roaming away from its respective home CSN 2026, or where broadband wireless access system 2000 is part of the regular service provider of fixed device 2016 or mobile device 2022 but where broadband wireless access system 2000 may be in another location or state that is not the main or home location of fixed device 2016 or mobile device 2022.

Fixed device 2016 may be located anywhere within range of one or both base stations (or eNodeBs) 2014, 2020, such as in or near a home or business to provide home or business customer broadband access to Internet 2010 via base stations (or eNodeBs) 2014, 2020 and ASNs 2012, 2018, respectively, and home CSN 2026. It is worthy of note that although fixed device 2016 is generally disposed in a stationary location, it may be moved to different locations as needed. Mobile device 2022 may be utilized at one or more locations if mobile device 2022 is within range of one or both base stations (or eNodeBs) 2014, 2020, for example.

In accordance with one or more embodiments, operation support system (OSS) 2028 may be part of broadband wireless access system 2000 to provide management functions for broadband wireless access system 2000 and to provide interfaces between functional entities of broadband wireless access system 2000. Broadband wireless access system 2000 of FIG. 20 is merely one type of wireless network showing a certain number of the components of broadband wireless access system 2000, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an evolved node B (eNB), comprising: a processor circuit; a detection component for execution by the processor circuit to detect user plane congestion between an evolved universal mobile telecommunications system (UMTS) terrestrial radio access network (E-UTRAN) and a serving gateway (S-GW) of an evolved packet core (EPC); and a configuration component for execution by the processor circuit to select a set of user equipment (UEs) served by the E-UTRAN and the S-GW and send a request to utilize an alternate S-GW of the EPC to serve the set of UEs while maintaining a current packet data network (PDN) gateway (P-GW) for the set of UEs.

In Example 2, the detection component of Example 1 may optionally be for execution by the processor circuit to detect the user plane congestion in an S1-U interface between the E-UTRAN and the S-GW.

In Example 3, the configuration component of any one of Examples 1 to 2 may optionally be for execution by the processor circuit to select the set of UEs from among a plurality of UEs that are in a connected mode.

In Example 4, the configuration component of any one of Examples 1 to 3 may optionally be for execution by the processor circuit to select the set of UEs from among a plurality of UEs served by the eNB.

In Example 5, the request of any one of Examples 1 to 4 may optionally comprise a request to utilize the alternate S-GW to serve the set of UEs in both an uplink direction and a downlink direction when the detection component detects the user plane congestion in both the uplink direction and the downlink direction.

In Example 6, the request of any one of Examples 1 to 5 may optionally comprise a request to utilize the alternate S-GW to serve the set of UEs in only an uplink direction or only a downlink direction when the detection component detects the user plane congestion in only the uplink direction or only the downlink direction.

In Example 7, the request of any one of Examples 1 to 6 may optionally comprise a Path Switch Request message including an information element indicating that user plane congestion (UPCON) mitigation is to be performed for an S1-U interface between the E-UTRAN and the S-GW.

In Example 8, the eNB of any one of Examples 1 to 7 may optionally comprise one or more radio frequency (RF) antennas.

Example 9 is a mobility management entity (MME), comprising: processing circuitry; a detection component for execution by the processing circuitry to identify S1-U interface congestion with respect to an interface between a source serving gateway (S-GW) and an evolved universal mobile telecommunications system (UMTS) terrestrial radio access network (E-UTRAN); and a configuration component for execution by the processing circuitry to select a target S-GW for which an S1-U interface to the E-UTRAN is uncongested, select, from among user equipment (UEs) served by an evolved node B (eNB) of the E-UTRAN, a set of UEs for which the source S-GW provides data plane connectivity to a packet data network (PDN) gateway (P-GW), and initiate congestion mitigation comprising reassigning the set of UEs to the target S-GW for data plane connectivity to the P-GW with respect to at least one of a downlink direction and an uplink direction, while maintaining the P-GW for the set of UEs.

In Example 10, the configuration component of Example 9 may optionally be for execution by the processing circuitry to: when S1-U interface congestion is identified with respect to only the downlink direction, initiate congestion mitigation comprising reassigning the set of UEs to the target S-GW with respect to only the downlink direction while maintaining the source S-GW with respect to the uplink direction; when S1-U interface congestion is identified with respect to only the uplink direction, initiate congestion mitigation comprising reassigning the set of UEs to the target S-GW with respect to only the uplink direction while maintaining the source S-GW with respect to the downlink direction; and when S1-U interface congestion is identified with respect to both the downlink direction and the uplink direction, initiate congestion mitigation comprising reassigning the set of UEs to the target S-GW with respect to both the uplink direction and the downlink direction.

In Example 11, the detection component of any one of Examples 9 to 10 may optionally be for execution by the processing circuitry to identify the S1-U interface congestion with respect to the interface between the source S-GW and the E-UTRAN based on one or both of a comparison of a downlink traffic level of the interface with a downlink capacity of the interface and a comparison of an uplink traffic level of the interface with an uplink capacity of the interface.

In Example 12, the set of UEs of any one of Examples 9 to 11 may optionally be selected from among connected mode UEs served by the eNB.

In Example 13, the configuration component of any one of Examples 9 to 12 may optionally be for execution by the processing circuitry to initiate the congestion mitigation by sending a Create Session Request message.

In Example 14, the configuration component of any one of Examples 9 to 12 may optionally be for execution by the processing circuitry to initiate the congestion mitigation by sending an E-UTRAN radio access bearer (E-RAB) message.

In Example 15, the detection component of any one of Examples 9 to 14 may optionally be for execution by the processing circuitry to receive traffic information for the target S-GW and determine that the S1-U interface from the target S-GW to the E-UTRAN is uncongested based on the traffic information.

In Example 16, the congestion mitigation of any one of Examples 9 to 15 may optionally comprise maintaining the source S-GW for at least one UE served by the eNB.

In Example 17, the MME of any one of Examples 9 to 16 may optionally comprise a radio frequency (RF) transceiver and one or more RF antennas.

Example 18 is a congestion mitigation method, comprising: detecting, by processing circuitry at a first serving general packet radio service support node (SGSN), user plane congestion (UPCON) with respect to one or both of an uplink direction and a downlink direction in an interface between a radio access network and the first SGSN; selecting a second SGSN; and sending a trigger message to initiate UPCON mitigation comprising reallocating user plane traffic of a set of mobile devices from the first SGSN to the second SGSN, while maintaining a current serving gateway (S-GW) to handle the user plane traffic of the set of mobile devices.

In Example 19, the congestion mitigation method of Example 18 may optionally comprise selecting the set of mobile devices from among connected mode mobile devices in the radio access network for which user plane traffic is handled by the first SGSN.

In Example 20, the congestion mitigation method of any one of Examples 18 to 19 may optionally comprise selecting as the second SGSN an SGSN for which an interface connection to the radio access network is uncongested.

In Example 21, the interface of any one of Examples 18 to 20 may optionally comprise an Iu-PS interface, the radio access network may optionally comprise a universal mobile telecommunications system (UMTS) terrestrial radio access network (UTRAN), and the set of mobile devices may optionally comprise a set of user equipment (UEs) selected from among UEs served by a radio network controller (RNC) of the UTRAN.

In Example 22, the interface of any one of Examples 18 to 20 may optionally comprise a Gb interface, the radio access network may optionally comprise a global system for mobile communications (GSM)/enhanced data rates for GSM evolution (EDGE) radio access network (GERAN), and the set of mobile devices may optionally comprise a set of mobile stations (MSs) selected from among MSs served by a base station controller (BSC) of the GERAN.

In Example 23, the UPCON mitigation of any one of Examples 18 to 22 may optionally comprise reallocating the user plane traffic of the set of mobile devices from the first SGSN to the second SGSN, while maintaining the current S-GW and a current packet data network (PDN) gateway (P-GW) to handle the user plane traffic of the set of mobile devices.

In Example 24, the UPCON mitigation of any one of Examples 18 to 23 may optionally comprise: when UPCON is detected with respect to only the uplink direction, reallocating uplink user plane traffic of the set of mobile devices from the first SGSN to the second SGSN, while maintaining the first SGSN to handle downlink user plane traffic of the set of mobile devices; and when UPCON is detected with respect to only the downlink direction, reallocating downlink user plane traffic of the set of mobile devices from the first SGSN to the second SGSN, while maintaining the first SGSN to handle uplink user plane traffic of the set of mobile devices.

In Example 25, the trigger message of any one of Examples 18 to 24 may optionally comprise an Iu Switch Request or a Gb Switch Request.

Example 26 is at least one machine-readable medium comprising a set of instructions that, in response to being executed on a computing device, cause the computing device to perform a congestion mitigation method according to any one of Examples 18 to 25.

Example 27 is an apparatus, comprising means for performing a congestion mitigation method according to any one of Examples 18 to 25.

Example 28 is a system, comprising: an apparatus according to Example 27; and one or more radio frequency (RF) transceivers.

Example 29 is a communications device arranged to perform a congestion mitigation method according to any one of Examples 18 to 25.

Example 30 is a congestion mitigation method, comprising: identifying, by an evolved node B (eNB), S1-U interface congestion with respect to an interface between a source serving gateway (S-GW) and an evolved universal mobile telecommunications system (UMTS) terrestrial radio access network (E-UTRAN) of the eNB; selecting a target S-GW for which an S1-U interface to the E-UTRAN is uncongested; selecting, from among user equipment (UEs) served by the eNB, a set of UEs for which the source S-GW provides data plane connectivity to a packet data network (PDN) gateway (P-GW); and initiating congestion mitigation comprising reassigning the set of UEs to the target S-GW for data plane connectivity to the P-GW with respect to at least one of a downlink direction and an uplink direction, while maintaining the P-GW for the set of UEs.

In Example 31, the congestion mitigation method of Example 30 may optionally comprise: when S1-U interface congestion is identified with respect to only the downlink direction, initiating congestion mitigation comprising reassigning the set of UEs to the target S-GW with respect to only the downlink direction while maintaining the source S-GW with respect to the uplink direction; when S1-U interface congestion is identified with respect to only the uplink direction, initiating congestion mitigation comprising reassigning the set of UEs to the target S-GW with respect to only the uplink direction while maintaining the source S-GW with respect to the downlink direction; and when S1-U interface congestion is identified with respect to both the downlink direction and the uplink direction, initiating congestion mitigation comprising reassigning the set of UEs to the target S-GW with respect to both the uplink direction and the downlink direction.

In Example 32, the congestion mitigation method of any one of Examples 30 to 31 may optionally comprise identifying the S1-U interface congestion with respect to the interface between the source S-GW and the E-UTRAN based on one or both of a comparison of a downlink traffic level of the interface with a downlink capacity of the interface and a comparison of an uplink traffic level of the interface with an uplink capacity of the interface.

In Example 33, the set of UEs of any one of Examples 30 to 32 may optionally be selected from among connected mode UEs served by the eNB.

In Example 34, the congestion mitigation method of any one of Examples 30 to 33 may optionally comprise initiating the congestion mitigation by sending a Path Switch Request message.

In Example 35, the Path Switch Request message of Example 34 may optionally comprise an information element indicating that user plane congestion (UPCON) mitigation is to be performed for the interface between the S-GW and the E-UTRAN.

In Example 36, the congestion mitigation method of any one of Examples 30 to 35 may optionally comprise receiving traffic information for the target S-GW and determining that the S1-U interface from the target S-GW to the E-UTRAN is uncongested based on the traffic information.

In Example 37, the congestion mitigation of any one of Examples 30 to 36 may optionally comprise maintaining the source S-GW for at least one UE served by the eNB.

Example 38 is at least one machine-readable medium comprising a set of instructions that, in response to being executed on a computing device, cause the computing device to perform a congestion mitigation method according to any one of Examples 30 to 37.

Example 39 is an apparatus, comprising means for performing a congestion mitigation method according to any one of Examples 30 to 37.

Example 40 is a system, comprising: an apparatus according to Example 39; and one or more radio frequency (RF) transceivers.

Example 41 is a communications device arranged to perform a congestion mitigation method according to any one of Examples 30 to 37.

Example 42 is a user plane congestion mitigation method, comprising: detecting, by a mobility management entity (MME), user plane congestion between an evolved universal mobile telecommunications system (UMTS) terrestrial radio access network (E-UTRAN) and a serving gateway (S-GW) of an evolved packet core (EPC); selecting a set of user equipment (UEs) served by the E-UTRAN and the S-GW; and sending a request to utilize an alternate S-GW of the EPC to serve the set of UEs while maintaining a current packet data network (PDN) gateway (P-GW) for the set of UEs.

In Example 43, the user plane congestion mitigation method of Example 42 may optionally comprise detecting the user plane congestion in an S1-U interface between the E-UTRAN and the S-GW.

In Example 44, the user plane congestion mitigation method of any one of Examples 42 to 43 may optionally comprise selecting the set of UEs from among a plurality of UEs that are in a connected mode.

In Example 45, the user plane congestion mitigation method of any one of Examples 42 to 44 may optionally comprise selecting the set of UEs from among a plurality of UEs served by an evolved node B (eNB) of the E-UTRAN.

In Example 46, the request of any one of Examples 42 to 45 may optionally comprise a request to utilize the alternate S-GW to serve the set of UEs in both an uplink direction and a downlink direction when user plane congestion is detected in both the uplink direction and the downlink direction.

In Example 47, the request of any one of Examples 42 to 46 may optionally comprise a request to utilize the alternate S-GW to serve the set of UEs in only an uplink direction or only a downlink direction when user plane congestion is detected in only the uplink direction or only the downlink direction.

In Example 48, the request of any one of Examples 42 to 47 may optionally comprise a Create Session Request message including an information element indicating that user plane congestion mitigation is to be performed for an S1-U interface between the E-UTRAN and the S-GW.

In Example 49, the request of any one of Examples 42 to 47 may optionally comprise an E-UTRAN radio access bearer (E-RAB) message including an information element indicating that user plane congestion mitigation is to be performed for an S1-U interface between the E-UTRAN and the S-GW.

Example 50 is at least one machine-readable medium comprising a set of instructions that, in response to being executed on a computing device, cause the computing device to perform a user plane congestion mitigation method according to any one of Examples 42 to 49.

Example 51 is an apparatus, comprising means for performing a user plane congestion mitigation method according to any one of Examples 42 to 49.

Example 52 is a system, comprising: an apparatus according to Example 51; and one or more radio frequency (RF) transceivers.

Example 53 is a communications device arranged to perform a user plane congestion mitigation method according to any one of Examples 42 to 49.

Example 54 is a radio network controller (RNC), comprising: processing circuitry; a detection component for execution by the processing circuitry to detect user plane congestion between a universal mobile telecommunications system (UMTS) terrestrial radio access network (UTRAN) and a serving general packet radio service support node (SGSN); and a configuration component for execution by the processing circuitry to select a set of user equipment (UEs) served by the UTRAN and the SGSN and send a request to utilize an alternate SGSN to serve the set of UEs while maintaining a current serving gateway (S-GW) for the set of UEs.

In Example 55, the detection component of Example 54 may optionally be for execution by the processing circuitry to detect the user plane congestion in an Iu-PS interface between the UTRAN and the SGSN.

In Example 56, the configuration component of any one of Examples 54 to 55 may optionally be for execution by the processing circuitry to select the set of UEs from among a plurality of UEs that are in a connected mode.

In Example 57, the configuration component of any one of Examples 54 to 56 may optionally be for execution by the processing circuitry to select the set of UEs from among a plurality of UEs served by the RNC.

In Example 58, the request of any one of Examples 54 to 57 may optionally comprise a request to utilize the alternate SGSN to serve the set of UEs in both an uplink direction and a downlink direction when the detection component detects the user plane congestion in both the uplink direction and the downlink direction.

In Example 59, the request of any one of Examples 54 to 58 may optionally comprise a request to utilize the alternate SGSN to serve the set of UEs in only an uplink direction or only a downlink direction when the detection component detects the user plane congestion in only the uplink direction or only the downlink direction.

In Example 60, the request of any one of Examples 54 to 59 may optionally comprise an Iu Switch Request message including an information element indicating that user plane congestion (UPCON) mitigation is to be performed for an Iu-PS interface between the UTRAN and the SGSN.

Example 61 is a system, comprising: the RNC of any one of Examples 54 to 60; and one or more radio frequency (RF) transceivers.

Example 62 is a base station controller (BSC), comprising: a processor circuit; a detection component for execution by the processor circuit to identify Gb interface congestion with respect to an interface between a source serving general packet radio service support node (SGSN) and a global system for mobile communications (GSM)/enhanced data rates for GSM evolution (EDGE) radio access network (GERAN); and a configuration component for execution by the processor circuit to select a target SGSN for which a Gb interface to the GERAN is uncongested, select, from among mobile stations (MSs) served by the BSC, a set of MSs for which the source SGSN provides data plane connectivity to a serving gateway (S-GW), and initiate congestion mitigation comprising reassigning the set of MSs to the target SGSN for data plane connectivity to the S-GW with respect to at least one of a downlink direction and an uplink direction, while maintaining the S-GW for the set of MSs.

In Example 63, the configuration component of Example 62 may optionally be for execution by the processor circuit to: when Gb interface congestion is identified with respect to only the downlink direction, initiate congestion mitigation comprising reassigning the set of MSs to the target SGSN with respect to only the downlink direction while maintaining the source SGSN with respect to the uplink direction; when Gb interface congestion is identified with respect to only the uplink direction, initiate congestion mitigation comprising reassigning the set of MSs to the target SGSN with respect to only the uplink direction while maintaining the source SGSN with respect to the downlink direction; and when Gb interface congestion is identified with respect to both the downlink direction and the uplink direction, initiate congestion mitigation comprising reassigning the set of MSs to the target SGSN with respect to both the uplink direction and the downlink direction.

In Example 64, the detection component of any one of Examples 62 to 63 may optionally be for execution by the processor circuit to identify the Gb interface congestion with respect to the interface between the source SGSN and the GERAN based on one or both of a comparison of a downlink traffic level of the interface with a downlink capacity of the interface and a comparison of an uplink traffic level of the interface with an uplink capacity of the interface.

In Example 65, the set of MSs of any one of Examples 62 to 64 may optionally be selected from among connected mode MSs served by the BSC.

In Example 66, the configuration component of any one of Examples 62 to 65 may optionally be for execution by the processor circuit to initiate the congestion mitigation by sending a Gb Switch Request message.

In Example 67, the detection component of any one of Examples 62 to 66 may optionally be for execution by the processor circuit to receive traffic information for the target SGSN and determine that the Gb interface from the target SGSN to the GERAN is uncongested based on the traffic information.

In Example 68, the congestion mitigation of any one of Examples 62 to 67 may optionally comprise maintaining the source SGSN for at least one MS served by the BSC.

Example 69 is a system, comprising: the BSC of any one of Examples 62 to 68; and one or more radio frequency (RF) transceivers.

Example 70 is a system, comprising: the BSC of any one of Examples 62 to 68; and one or more radio frequency (RF) antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An evolved node B (eNB), comprising:
a processor circuit;
a detection component for execution by the processor circuit to detect user plane congestion between an evolved universal mobile telecommunications system (UMTS) terrestrial radio access network (E-UTRAN) and a serving gateway (S-GW) of an evolved packet core (EPC); and
a configuration component for execution by the processor circuit to, in response to the detection of the user plane congestion, select a set of user equipment (UEs) served by the E-UTRAN and the S-GW and send a request to utilize an alternate S-GW of the EPC to serve the set of UEs while maintaining a current packet data network (PDN) gateway (P-GW) for the set of UEs.

2. The eNB of claim 1, the detection component for execution by the processor circuit to detect the user plane congestion in an S1-U interface between the E-UTRAN and the S-GW.

3. The eNB of claim 1, the configuration component for execution by the processor circuit to select the set of UEs from among a plurality of UEs that are in a connected mode.

4. The eNB of claim 1, the configuration component for execution by the processor circuit to select the set of UEs from among a plurality of UEs served by the eNB.

5. The eNB of claim 1, the request comprising a request to utilize the alternate S-GW to serve the set of UEs in both an uplink direction and a downlink direction when the detection component detects the user plane congestion in both the uplink direction and the downlink direction.

6. The eNB of claim 1, the request comprising a request to utilize the alternate S-GW to serve the set of UEs in only an uplink direction or only a downlink direction when the detection component detects the user plane congestion in only the uplink direction or only the downlink direction.

7. The eNB of claim 1, the request comprising a Path Switch Request message including an information element indicating that user plane congestion (UPCON) mitigation is to be performed for an S1-U interface between the E-UTRAN and the S-GW.

8. The eNB of claim 1, comprising one or more radio frequency (RF) antennas.

9. A mobility management entity (MME), comprising:
processing circuitry;
a detection component for execution by the processing circuitry to identify S1-U interface congestion with respect to an interface between a source serving gateway (S-GW) and an evolved universal mobile telecommunications system (UMTS) terrestrial radio access network (E-UTRAN); and
a configuration component for execution by the processing circuitry to select a target S-GW for which an S1-U interface to the E-UTRAN is uncongested, select, from among user equipment (UEs) served by an evolved node B (eNB) of the E-UTRAN, a set of UEs for which the source S-GW provides data plane connectivity to a packet data network (PDN) gateway (P-GW), and initiate congestion mitigation comprising reassigning the set of UEs to the target S-GW for data plane connectivity to the P-GW with respect to at least one of a downlink direction and an uplink direction, while maintaining the P-GW for the set of UEs.

10. The MME of claim 9, the configuration component for execution by the processing circuitry to:
when S1-U interface congestion is identified with respect to only the downlink direction, initiate congestion mitigation comprising reassigning the set of UEs to the target S-GW with respect to only the downlink direction while maintaining the source S-GW with respect to the uplink direction;
when S1-U interface congestion is identified with respect to only the uplink direction, initiate congestion mitigation comprising reassigning the set of UEs to the target S-GW with respect to only the uplink direction while maintaining the source S-GW with respect to the downlink direction; and
when S1-U interface congestion is identified with respect to both the downlink direction and the uplink direction, initiate congestion mitigation comprising reassigning the set of UEs to the target S-GW with respect to both the uplink direction and the downlink direction.

11. The MME of claim 9, the detection component for execution by the processing circuitry to identify the S1-U interface congestion with respect to the interface between the source S-GW and the E-UTRAN based on one or both of a comparison of a downlink traffic level of the interface with a downlink capacity of the interface and a comparison of an uplink traffic level of the interface with an uplink capacity of the interface.

12. The MME of claim 9, the set of UEs selected from among connected mode UEs served by the eNB.

13. The MME of claim 9, the configuration component for execution by the processing circuitry to initiate the congestion mitigation by sending a Create Session Request message.

14. The MME of claim 9, the configuration component for execution by the processing circuitry to initiate the congestion mitigation by sending an E-UTRAN radio access bearer (E-RAB) message.

15. The MME of claim 9, the detection component for execution by the processing circuitry to receive traffic information for the target S-GW and determine that the S1-U interface from the target S-GW to the E-UTRAN is uncongested based on the traffic information.

16. The MME of claim 9, the congestion mitigation comprising maintaining the source S-GW for at least one UE served by the eNB.

17. The MME of claim 9, comprising a radio frequency (RF) transceiver and one or more RF antennas.

18. A method, comprising:
- detecting, by processing circuitry at a first serving general packet radio service support node (SGSN), user plane congestion (UPCON) with respect to one or both of an uplink direction and a downlink direction in an interface between a radio access network and the first SGSN;
- selecting a second SGSN; and
- sending a trigger message to initiate UPCON mitigation comprising reallocating user plane traffic of a set of mobile devices from the first SGSN to the second SGSN, while maintaining a current serving gateway (S-GW) to handle the user plane traffic of the set of mobile devices.

19. The method of claim 18, comprising selecting the set of mobile devices from among connected mode mobile devices in the radio access network for which user plane traffic is handled by the first SGSN.

20. The method of claim 18, comprising selecting as the second SGSN an SGSN for which an interface connection to the radio access network is uncongested.

21. The method of claim 18, the interface comprising an Iu-PS interface, the radio access network comprising a universal mobile telecommunications system (UMTS) terrestrial radio access network (UTRAN), the set of mobile devices comprising a set of user equipment (UEs) selected from among UEs served by a radio network controller (RNC) of the UTRAN.

22. The method of claim 18, the interface comprising a Gb interface, the radio access network comprising a global system for mobile communications (GSM)/enhanced data rates for GSM evolution (EDGE) radio access network (GERAN), the set of mobile devices comprising a set of mobile stations (MSs) selected from among MSs served by a base station controller (BSC) of the GERAN.

23. The method of claim 18, the UPCON mitigation comprising reallocating the user plane traffic of the set of mobile devices from the first SGSN to the second SGSN, while maintaining the current S-GW and a current packet data network (PDN) gateway (P-GW) to handle the user plane traffic of the set of mobile devices.

24. The method of claim 18, the UPCON mitigation comprising:
- when UPCON is detected with respect to only the uplink direction, reallocating uplink user plane traffic of the set of mobile devices from the first SGSN to the second SGSN, while maintaining the first SGSN to handle downlink user plane traffic of the set of mobile devices; and
- when UPCON is detected with respect to only the downlink direction, reallocating downlink user plane traffic of the set of mobile devices from the first SGSN to the second SGSN, while maintaining the first SGSN to handle uplink user plane traffic of the set of mobile devices.

25. The method of claim 18, the trigger message comprising an Iu Switch Request or a Gb Switch Request.

* * * * *